United States Patent [19]

Shinbori et al.

[11] Patent Number: 5,781,236
[45] Date of Patent: Jul. 14, 1998

[54] IMAGE SENSING APPARATUS AND IMAGE SENSING METHOD

[75] Inventors: Kenichi Shinbori, Yokohama; Yoshiro Udagawa, Miyashiro-machi; Hiroshi Saruwatari, Kawasaki, all of Japan

[73] Assignee: Canon Kabushiki Kaisha, Tokyo, Japan

[21] Appl. No.: 397,370

[22] Filed: Mar. 2, 1995

[30] Foreign Application Priority Data

Mar. 4, 1994 [JP] Japan .................. 6-058337
Jul. 11, 1994 [JP] Japan .................. 6-181813

[51] Int. Cl.⁶ .................. H04N 9/68; H04N 5/225
[52] U.S. Cl. .................. 348/342; 348/234; 348/294
[58] Field of Search .................. 348/234, 294, 348/342, 270; H04N 9/68, 5/225

[56] References Cited

U.S. PATENT DOCUMENTS

| | | | |
|---|---|---|---|
| 4,805,028 | 2/1989 | Nishioka | 358/225 |
| 4,988,171 | 1/1991 | Yokota | 350/404 |
| 5,091,795 | 2/1992 | Nishioka | 359/93 |
| 5,335,082 | 8/1994 | Sable | 358/350 |
| 5,379,069 | 1/1995 | Tani | 348/333 |
| 5,392,067 | 2/1995 | Konno | 348/72 |
| 5,434,709 | 7/1995 | Yamada | 359/569 |
| 5,471,343 | 11/1995 | Takasugi | 348/342 |
| 5,477,381 | 12/1995 | Sasaki et al. | 348/342 |
| 5,523,802 | 6/1996 | Sugihara et al. | 348/786 |
| 5,565,933 | 10/1996 | Reinsch | 348/758 |

FOREIGN PATENT DOCUMENTS

| | | |
|---|---|---|
| 59-169285 | 9/1984 | Japan |
| 4-70275 | 3/1992 | Japan |

Primary Examiner—Mark R. Powell
Assistant Examiner—Vivek Srivastava
Attorney, Agent, or Firm—Fitzpatrick, Cella, Harper & Scinto

[57] ABSTRACT

An image sensing apparatus has a cut-off characteristic which is changed by a mechanism for rotating a simple optical low-pass filter having a tightly sealed structure about the periphery of the photographic optical path. Light from a lens representing a subject is received and converted by an image sensing unit upon having its high-frequency components attenuated by a suitable cut-off characteristic, which is for obtaining a color natural image, of a stacked member including an optical low-pass filter or birefringence plates constructing an optical low-pass filter. In a case where a monochromatic image is obtained, some or all of the birefringence plates are rotated through a predetermined angle by changeover means such as a transmission member without sacrificing the seal about the periphery of the optical path, thereby changing over the cut-off characteristic of the optical low-pass filter to a cut-off characteristic suitable for obtaining a monochromatic image. The light from the subject is then received and converted by the image sensing unit.

7 Claims, 30 Drawing Sheets

C:CYAN
Y:YELLOW
M:MAGENTA
G:GREEN

5,781,236

IMAGE SENSING APPARATUS AND IMAGE SENSING METHOD

BACKGROUND OF THE INVENTION

This invention relates to an image sensing apparatus and method for limiting the spatial frequency of light from a subject incident upon an image sensing element.

In order to obtain a color natural image by means of an image sensing element, it is necessary in the prior art to suppress the effects of a luminance spurious signal and of the carrier components of a spurious color signal by placing an optical filter, which comprises a birefringence plate, in the optical path from a photographic lens system to the image sensing element.

FIG. 33 is a diagram showing the array of pixels and an example of an aperture in a conventional solid-state image sensing element.

In FIG. 33, H represents the horizontal scanning direction and V the vertical scanning direction. A green filter 1G and a blue filter 1B are placed on one of two mutually adjacent horizontal lines, and a green filter 2G and red filter 2R are placed on the other of the two mutually adjacent horizontal lines. The filters 1G and 1B are arranged alternately at a pixel spacing ph in the horizontal direction, as are the filters 2G and 2R. In the vertical scanning direction, the pixel spacing between the filters is pv.

Light from a subject is sampled by the aperture pattern on the lattice of this type. As evident from the sampling theorem, a spatial frequency above the Nyquist point corresponding to one-half the sampling frequency cannot in principle be reproduced faithfully. When frequency components above the Nyquist point are introduced to a solid-state image sensing element, these components return and appear as spurious signals.

FIGS. 34 and 35 illustrate spatial frequency spectra in the solid-state image sensing device shown in FIG. 33.

The horizontal axis fx in FIG. 34 and the horizontal axis fy in FIG. 35 illustrate horizontal and vertical frequencies normalized by ph/2π and pv/2π, respectively.

Owing to carrier components centered on the position "fx=1, fy=0", moiré(a spurious signal in luminance) appears and is returned in the region of oblique lines on the left side of FIG. 34 when the spatial frequency of fine monochrome stripes extending in the vertical direction is in the region of the vertical lines. Owing to carrier components centered on the position "fx=½, fy=0", green and magenta cross colors (spurious color signals) are produced when there are somewhat coarse monochrome stripes extending in the vertical direction.

Owing to carrier components centered on the position "fx=0, fy=1", moiré appears and is returned in the region of oblique lines in FIG. 35 when the spatial frequency of fine horizontal stripes is in the region of the vertical lines in FIG. 35. Since the effects of these luminance spurious signals and spurious color signals upon image quality are great, it is necessary, in accordance with the sampling theorem, to eliminate the following from the incident light: horizontal frequency components above fx=½ at the normalized horizontal frequency, vertical frequency components above fy=½ at the normalized vertical frequency, and, since the color signal is sampled at the point fx=½ in the horizontal direction, horizontal frequency components of the frequency band of the color signal centered on the point fx=½.

FIGS. 36A and 36B are diagrams showing ideal optical frequency characteristics, in which FIG. 36A shows a horizontal frequency characteristic and FIG. 36B a vertical frequency characteristic. FIG. 37 illustrates a typical example of the conventional construction of an optical low-pass filter targeted on these frequency characteristics. Incident light which has entered via a photographic lens in FIG. 37 is supplied to a solid-state image sensing element upon passing through birefringence plates 11, 12, 13 in the order mentioned. The birefringence plate 11 separates the incident light into ordinary and extraordinary light rays. A principal plane of polarization 14 forms an angle of about 45° with respect to the horizontal scanning direction H in a direction perpendicular to the plane of the drawing in which the ordinary and extraordinary light rays exist.

The birefringence plate 12 separates the incident light into ordinary and extraordinary light rays. A principal plane of polarization 15, in which the ordinary and extraordinary light rays exist, approximately coincides with the horizontal scanning direction H. The birefringence plate 13 separates the incident light into ordinary and extraordinary light rays. A principal plane of polarization 16, in which the ordinary and extraordinary light rays exist, forms an angle of about −45° with respect to the horizontal scanning direction H.

FIG. 38 is an explanatory view showing the results obtained by separating the incident light. Let d1 represent the separation distance between the ordinary and extraordinary light rays of the birefringence plates 11 and 13, and let d2 represent the separation distance between the ordinary and extraordinary light rays of the birefringence plate 12. When the condition $d2/\sqrt{2} < d1 < (\sqrt{2})d2$ holds in this combination of the three birefringence plates 11, 12 and 13, one light ray (21) incident upon the origin is separated over the distance d1 in a direction at an angle of 45° to the horizontal scanning direction by means of the first birefringence plate 11, whereby two light rays (21, 22) of approximately equal intensity are obtained. Next, these light rays are each separated over the distance d2 in a direction parallel to the horizontal scanning direction by the second birefringence plate 12, whereby light rays (21, 22, 23, 24) of approximately equal intensity are obtained. Next, these light rays are each separated over the distance d1 in a direction at an angle of −45° to the horizontal scanning direction by means of the third birefringence plate 13, whereby eight light rays (21, 22, 23, 24, 25, 26, 27, 28) of approximately equal intensity are obtained.

If a general solution is found to the spatial frequency characteristics when use is made of such an optical low-pass filter, this can be thought of as a combination of an optical low-pass filter which separates light into ordinary and extraordinary light rays over the distance d2 in the horizontal direction, as shown in (A) of FIG. 39, and an optical low-pass filter which separates one light ray into four light rays at the vertex positions of a rhombus of length $d1/\sqrt{2}$, as shown in (B) of FIG. 39.

The optical low-pass filter of FIG. 39A has a frequency characteristic in the shape of a COS curve having a trap point at a point which is an odd-number multiple of (½)·(ph/d2) of the horizontal frequency normalized at ph/2π, and the optical low-pass filter of FIG. 39B has a frequency characteristic in the shape of a $COS^2$ curve having a trap point at a point which is an odd-number multiple of (½)·[ph/(d1/√2)] in the horizontal direction, and a frequency characteristic in the shape of a $COS^2$ curve having a trap point at a point which is an odd-number multiple of (½)·[pv/(d1/√2)] normalized at pv/2π in the vertical direction.

Accordingly, a general solution to the horizontal-direction spatial frequency characteristic of the optical low-pass filter in this case is as follows:

$$F1(fx) = \cos(\pi \cdot d2 \cdot fx/ph) \times \cos^2[(\pi \cdot d1/\sqrt{2}) \cdot (fx/ph)]$$

Further, a general solution to the spatial frequency characteristic in the vertical direction is the frequency characteristic:

$$F1(fy) = \cos^2[(\pi \cdot d1/\sqrt{2}) \cdot (fy/pv)]$$

FIG. 40 illustrates a horizontal spatial frequency spectrum in which ph and pv are assumed to be approximately equal values, e.g., when $d2 = ph$, $d1/\sqrt{2} = (2/3) \cdot ph = (2/3) \cdot pv$ are assumed to hold. A curve F1(fx), which is the result of combining the curve of $\cos(\pi \cdot fx)$ indicated by he dashed line and the curve of $\cos^2[(2/3) \cdot \pi \cdot fx]$ indicated by the dashed line, is the sought spatial frequency spectrum in the horizontal direction. The equation is expressed by the following:

$$F1(fx) = \cos(\pi \cdot fx) \times \cos^2[(2/3) \cdot \pi \cdot fx]$$

This is a cut-off characteristic near the ideal characteristic shown in FIG. 36A.

The curve shown in FIG. 41 is the spatial frequency spectrum F1(fy) in the vertical direction. This is expressed as follows:

$$F1(fy) = \cos^2[(2/3) \cdot \pi \cdot fy]$$

This is a cut-off characteristic near the ideal characteristic shown in FIG. 36B.

Stated in other words, the foregoing means that it is possible to approach the ideal cut-off characteristic by appropriately selecting the values of d1 and d2.

Thus, in a case where a color natural image is captured, the effects of a luminance spurious signal and of the carrier components of a spurious color signal are suppressed by placing the foregoing optical low-pass filter in the optical path of photography, as a result of which a suitable color reproducibility and resolution are obtained.

There is increasing demand for the photography of monochromatic subjects such as characters, illustrations and drawings, with verification being made by using a monitor or printout. In addition, there has been an increase in cases where bitmap data is applied to recognition software and converted to text data or function data. In such cases, a high resolution is required for the photographic image. However, with the cut-off characteristic of the above-mentioned optical low-pass filter, the edges of characters become blurred, jagged or discontinuous; hence, satisfactory performance cannot be obtained.

An example of measures to solve these problems has been proposed in the specification of Japanese Patent Application Laid-Open (KOKAI) No. 59-169285. Further, the art described in the specification of Japanese Patent Application Laid-Open (KOKAI) No. 4-70275 also is known.

FIG. 42 is a block diagram illustrating a conventional image recording system.

Realizing an improvement in resolution and an improvement in color reproducibility in an image recording system leads to contrary requirements. Accordingly, it is so arranged that manipulating a mode changeover switch 205 makes it possible to switch between color image processing and monochromatic image processing. In case of color image processing, light from a subject entrant from an imaging lens 200 is formed as an image on an image sensing element 203 such as a CCD via an optical low-pass filter 201 having a cut-off characteristic which suppresses high-frequency components.

In case of monochromatic image processing, an optical member 202 having an optical path length identical with that of the optical low-pass filter 201 is placed in the optical path instead of the low-pass filter 201 by an optical drive circuit 204. High-frequency components of the light from the subject, which components require attenuation in connection with sampling, are not attenuated that much in order to obtain a high-resolution image of the monochromatic subject.

In monochromatic image processing according to this example of the prior art, the arrangement is such that the optical low-pass filter 201 is retracted from the optical path of photography and is replaced by the optical member having the same optical path length. However, in the vicinity of the image forming surface, even small particles of dust are projected upon the surface and their shadows appear on the captured image. This can result in parts of an image becoming extremely unattractive. The periphery of the photographic optical path from the lens system 200 to the image sensing element 203 is a space requiring a sealed structure in view of the problem of dust. In addition, the optical low-pass filter 201, in which it is required that the incident light be a parallel flux, is placed between the photographic lens system and the image sensing element 203. This means that care must be taken to prevent dust from attaching itself to the optical low-pass filter 201 since it is an optical member very close to the image forming surface.

In the above-mentioned example of the prior art, however, the optical low-pass filter 201 is moved in and out of the photographic optical path mechanically. This makes it very easy for dust to be produced and for the dust to penetrate into the system.

Further, space is required in order for the optical low-pass filter 201 or the optical member 202 having the identical optical path to be fully retracted from the optical path. Furthermore, a complicated mechanism for changing over movement is required as well. This increases the size of the apparatus and therefore runs counter to miniaturization efforts.

Since the optical member for assuring the identical optical length and the complicated movement changeover mechanism are required, cost is raised.

With regard to the moving mechanism for fully moving the optical low-pass filter 201 and optical member 202 having the same optical path length in and out of the optical path, the structural components require mechanical precision and play for smooth sliding is necessary along the direction of the optic axis. Consequently, back focusing is extended and the photographic optical system is increased in size. The result is higher cost.

There are also cases in which the optical low-pass filter is completely eliminated, as a result of which moire stripes caused by return of high-frequency components occur even in a character image having many monochrome components. This can make it impossible to achieve the original high definition.

Furthermore, in signal processing, processing must be used that is the same as that employed when capturing an ordinary color image. As a result, the advantage of high precision cannot be exploited.

SUMMARY OF THE INVENTION

An object of the present invention is to provide an optical low-pass filter mechanism and an image sensing apparatus in which the mechanism peripheral to the photographic optical path is given a highly sealed structure to prevent the penetration of dust and intrusion of light resulting from leakage, and in which an inexpensive arrangement is adopted that does not require an optical member for assuring the same optical path length and a complicated movement changeover mechanism, thereby making possible a high resolution at the time of monochromatic image processing by changing the cut-off characteristic.

Another object of the invention is to provide an image sensing apparatus in which a high resolution is made possible by increasing image data at the time of monochromatic image processing.

According to the present invention, the foregoing objects are attained by providing an image sensing apparatus having an optical low-pass filter for limiting the spatial frequency of incident light from a subject, and an image sensing element for converting an optical image to an electric signal, wherein it is possible to switch between a first image sensing mode for forming a color natural-image signal using the electric signal from the image sensing element, and a second image sensing mode for forming a high-resolution image signal with respect to an image in a single color using the electric signal from the image sensing element, characterized in that all or part of the optical low-pass filter is rotated about a photographic optic axis to change the cut-off characteristic.

The optical low-pass filter is characterized in that a third birefringence plate is rotated through a predetermined angle relative to first and second birefringence plates in the second image sensing mode.

The optical low-pass filter is characterized in that the first birefringence plate is rotated through a predetermined angle while the second and third birefringence plates are held fixed in the second image sensing mode.

The optical low-pass filter is characterized in that the first and second birefringence plates are co-rotated through a predetermined angle while the third birefringence plate is held fixed in the second image sensing mode.

The optical low-pass filter is characterized in that the first and second birefringence plates are co-rotated through a fixed angle and the third birefringence plate is rotated through a fixed angle in the second image sensing mode.

The optical low-pass filter is characterized in that, in the second image sensing mode, the first birefringence plate is rotated through a predetermined predetermined angle while the second birefringence plate is held fixed, and a fourth birefringence plate is rotated through a predetermined angle while the third birefringence plate is held fixed.

The optical low-pass filter is characterized in that, in the second image sensing mode, the third and fourth birefringence plates are co-rotated through a predetermined fixed angle while the first and second birefringence plates are held fixed.

The optical low-pass filter is characterized in that, in the second image sensing mode, the first and second birefringence plates are co-rotated through a predetermined fixed angle while the third and fourth birefringence plates are held fixed.

In accordance with the arrangement described above, the image sensing apparatus has the first image sensing mode for forming a color natural-image signal using the electric signal from the image sensing element, and a second image sensing mode for forming a high-resolution image signal with respect to an image in a single color, wherein some or all birefringence plates of an optical low-pass filter constituted by three or four birefringence plates are rotated about an approximate photographic optic axis to change the cut-off characteristic. As a result, high-resolution processing is possible in the second image sensing mode.

Further, the foregoing objects are attained by providing an image sensing apparatus having an image sensing element for converting an optical image into an electric signal, and signal processing means for processing the electric signal obtained by the conversion, characterized by having an optical low-pass filter placed on the front surface of the image sensing element on the optic-axis side thereof, and rotational driving means for rotating the optical low-pass filter through a predetermined angle about the optic axis.

In the image sensing apparatus of this invention, the image sensing element is a solid-state image sensing element.

In the image sensing apparatus of this invention, the predetermined angle is set in such a manner that the pass band of the optical low-pass filter becomes broadest in at least one of the horizontal and vertical directions.

In the image sensing apparatus of this invention, the predetermined angle is set to a range of 45 ±5° when the pass band lies within a generally rectangular zone delimited by the horizontal and vertical directions.

In the image sensing apparatus of this invention, the signal processing means has generating means for generating a luminance signal. The procedure through which the luminance signal is generated is changed when the optical low-pass filter is being rotated.

In the image sensing apparatus of this invention, the luminance signal is generated by multiplying the values of the pixels of the image sensing element by a constant.

In the image sensing apparatus of this invention, display at the time of playback is a monochrome image based upon the luminance signal when the optical low-pass filter is being rotated.

In the image sensing apparatus of this invention, an index indicative of an image obtained by photography performed upon rotating the optical low-pass filter is recorded in information added on to the monochrome image. At the time of playback, the index is discriminated, the discriminated monochrome image is subjected to an optical reading operation and the read results are displayed and recorded.

In the image sensing apparatus of this invention, the rotational driving means is a manual lever, and the manual lever has switching means for changing over signal processing performed by the signal processing means.

In the image sensing apparatus of this invention, an infrared cutting filter is separately provided on the front surface of the optical low-pass filter, and the rotational driving means rotates the optical low-pass filter through a predetermined angle with respect to the infrared cutting filter.

In the image sensing method of this invention, in which an optical image is converted to an electric signal and the resulting electric signal is processed, an optical low-pass filter is placed on the front surface of the image sensing element on the optic-axis side thereof, and the optical low-pass filter is rotated through a predetermined angle about the optic axis.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

A digital still-video camera according to embodiments of an image sensing apparatus of the present invention will now be described.

[First Embodiment]

Figure 1:
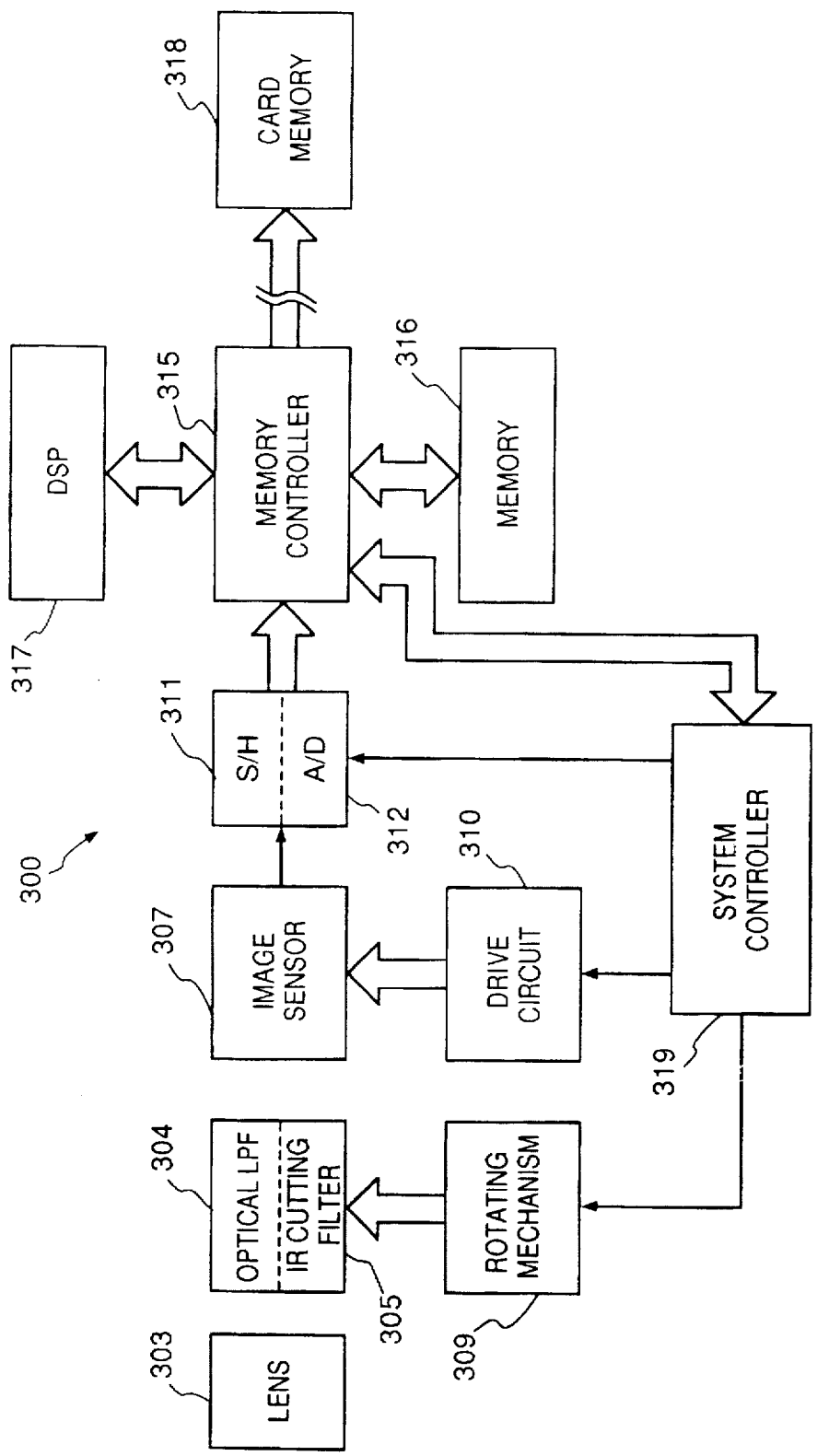
FIG. 1 is a block diagram illustrating the construction of a digital still-video camera serving as an image sensing apparatus according to a first embodiment of the present invention.

FIG. 1 is a block diagram illustrating the construction of a digital still-video camera according to a first embodiment of the present invention.

As shown in FIG. 1, a digital still-video camera 300 according to this embodiment includes a lens 303, an optical low-pass filter (LPF) 304, an infrared (IR) cutting filter 305, an image sensor 307, a rotating mechanism 309, a drive circuit 310, a sample-and-hold (S/H) circuit 311, an analog/digital converter circuit 312, a main controller 315, a memory 316, a digital signal processing circuit (DSP) 317, a card memory 318 and a system controller 319.

Light from a subject (not shown) such as a character passes through the lens 303 and then is acted upon by the optical low-pass filter (LPF) 304 and infrared (IR) cutting filter 305, whereupon the light is formed as an optical image on the photosensitive portion of the image sensor 307. The optical low-pass filter (LPF) 304 and infrared (IR) cutting filter 305 are rotated by the rotating mechanism 309 in a high-definition mode. The rotating mechanism 309 will be described later. The optical image formed on the photosensitive portion of the image sensor 307 is outputted from the image sensor 307 as an electrical signal. When the latter has been processed as a digital signal by the sample-and-hold (S/H) circuit 311 and analog/digital converter circuit 312, the processed signal is stored in the memory 316 by the memory controller 215. The digital signal stored in the memory 316 is subjected to aperture and color processing by the digital signal processing circuit (DSP) 317 and the processed signal is then recorded in the card memory 318. The latter is capable of being detached from the digital still-video camera. The system controller 319 performs overall control.

Figure 2:
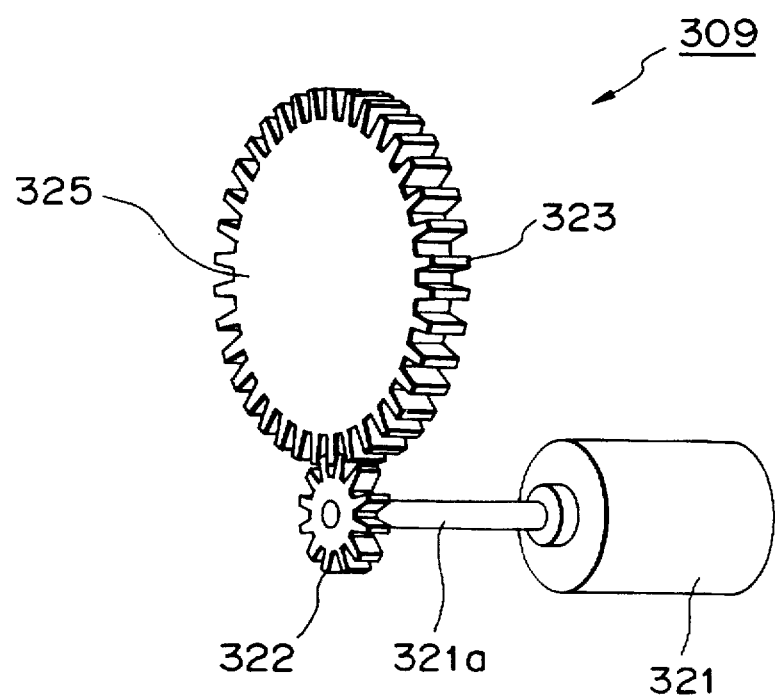
FIG. 2 is an explanatory view schematically illustrating a rotating mechanism.

Described next will be the rotating mechanism 309 for rotating the optical low-pass filter (LPF) 304 and infrared (IR) cutting filter 305. FIG. 2 is a diagram showing the rotating mechanism 309 in schematic form. As shown in FIG. 2, the rotating mechanism 309 includes a stepping motor 321, a gear 322 attached to a rotary shaft 321a of the stepping motor, and a gear 323 meshing with the gear 322. A stacked member 325 comprising the optical low-pass filter (LPF) 304 and infrared (IR) cutting filter 305 is formed on the surface of the gear 323. When the stepping motor 321 is rotated in response to a rotation command signal from the system controller 319, the gear 323 rotates and, hence, so does the stacked member 325 about its optic axis.

Figure 3:
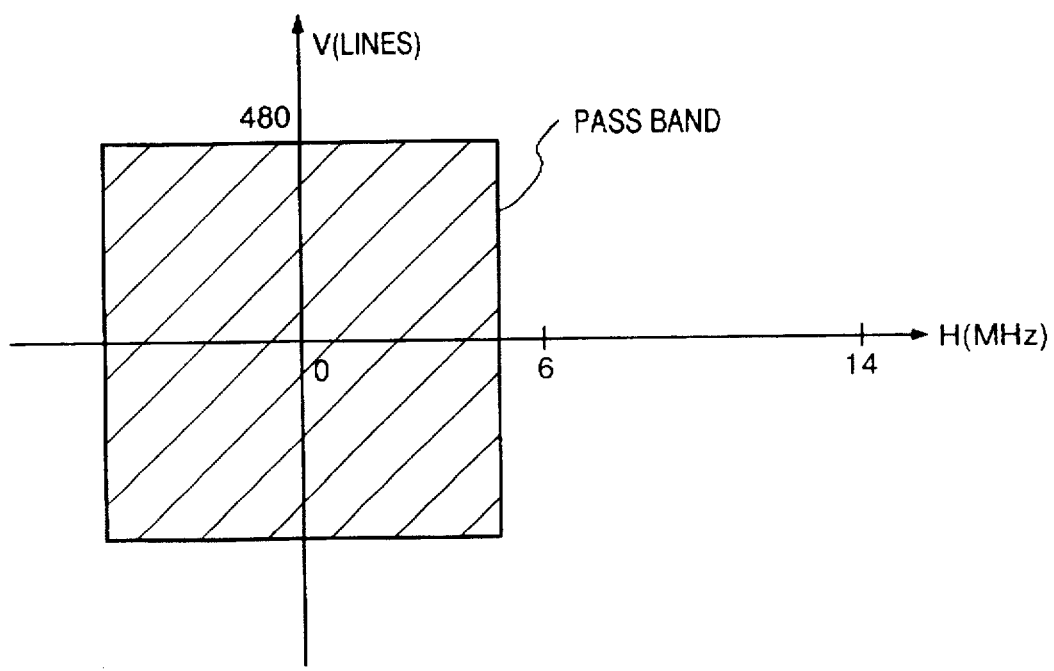
FIG. 3 is an explanatory view illustrating horizontal (H) and vertical (V) frequency characteristics of an optical low-pass filter.
Figure 4:
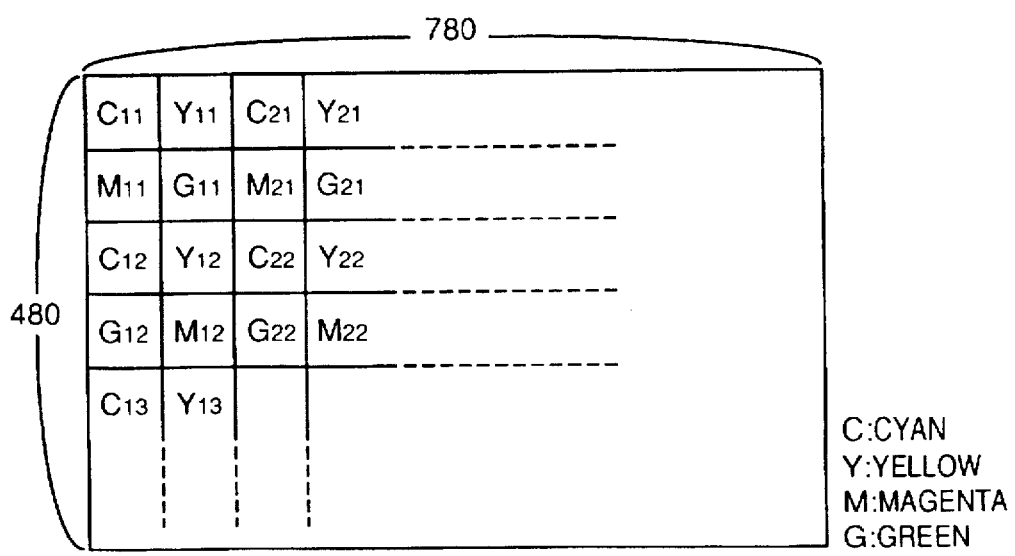
FIG. 4 is an explanatory view illustrating the construction of a color filter provided in an image sensor.

FIG. 3 is an explanatory view illustrating horizontal (H) and vertical (V) frequency characteristics of the optical low-pass filter (LPF) 304. The shaded area is the pass band of the optical low-pass filter (LPF) 304. FIG. 4 is an explanatory view showing a color filter provided on the image sensor 307. A color filter 307a is divided up into colors (C: cyan, Y: yellow, M: magenta, G: green) conforming to the number of pixels of the image sensor 307, which is composed of a total of about 400,000 pixels (which corresponds to a 14.3 MHz horizontally and 480 lines vertically). The optical low-pass filter (LPF) 304 is so designed as to eliminate return distortion by performing trapping in the vicinity of about 6 MHz in the horizontal (H) direction and about 480 lines in the vertical (V) direction in dependence upon the repetition pattern of the color filter 307a.

The electrical signal obtained from the image sensor 307 is converted into a luminance signal and color signals in accordance with Formula (1) below:

$$Y = C11 + Y11 + M11 + G11, Y11 + C21 + G11 + M21, \ldots$$

$$B-Y = (C11+M11) - (Y11+G11), (C21+M21) - (Y21+G21), \ldots$$

$$R-Y = \{(C12+G12) - (Y12+M12)\}, -\{(C22+G22) - (Y22+M22)\}$$

With regard to the color signals, processing such as achieving synchronousness between horizontal lines is performed. However, this processing is not described in detail.

Figure 5:
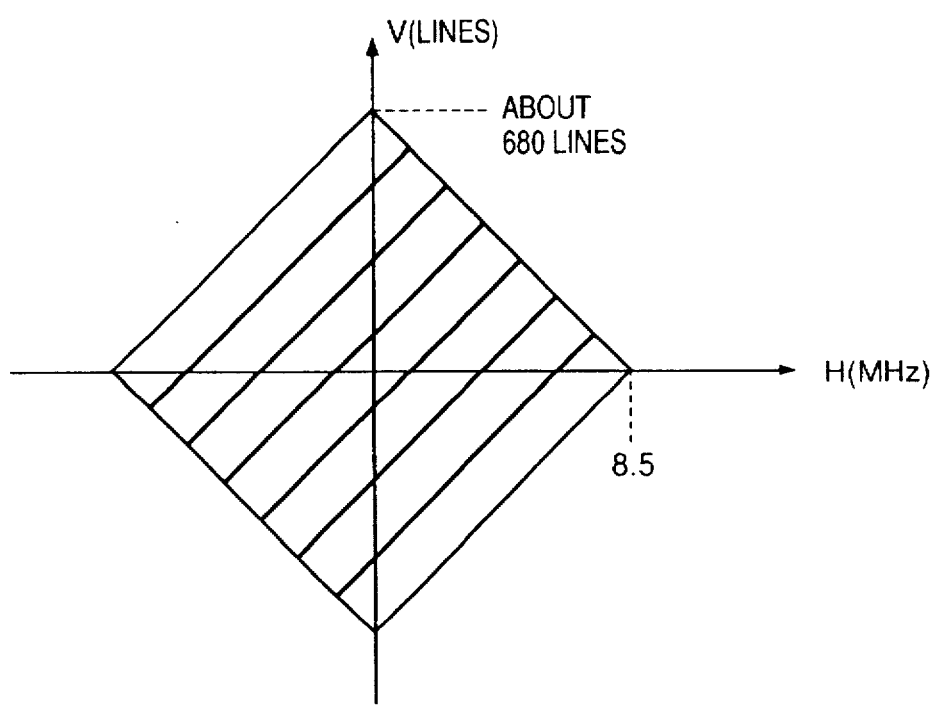
FIG. 5 is an explanatory view showing a pass band in a case where a stacked member has been rotated by 45°.

Next, a case in which the high-definition mode is selected will be described. The stacked member 325 is indexed by a predetermined angle by rotating the stepping motor 321 through a predetermined number of steps. FIG. 5 is an explanatory view illustrating the pass band in a case where the stacked member 325 has been rotated by 45°. It will be understood that the pass band is broadened the most in the vertical (V) and horizontal (H) directions. The luminance signal at this time is represented by Formula (2) below.

$$Y = a \times C11, b \times Y11, a \times C21, b \times Y21, \ldots$$
$$c \times M11, d \times G11, c \times M21, d \times G21, \ldots$$

where a, b, c and d are constants. These are coefficients for achieving white balance of the luminance signal Y. Thus, each pixel value is multiplied by a coefficient to produce the luminance signal Y. Since this case is limited to a monochrome character image, the monochrome image is stored in the card memory 318 without performing processing of color signals. It is preferred that the angle of rotation be set in the range of 40 ~50°.

A method of image reproduction in the high-definition mode will now be described. With regard to a character image selected and accepted in the high-definition mode, an index indicating this is written in the attribute (additional information). At the time of reproduction, this index is discriminated automatically, after which an OCR (optical character reader) program is started up to read the character. The read character is reproduced and recorded again as document data in accordance with the layout of the image.

[Example of construction of optical low-pass filter]

A detailed description will how be had with regard to the structure for rotating the optical low-pass filter about the optic axis in a case where the low-pass filter comprises a plurality of birefringence plates.

Figure 7:
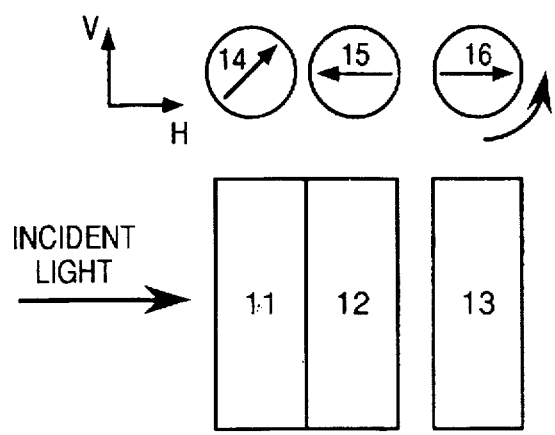
FIG. 7 is a diagram showing an example of the construction an optical low-pass filter of an image sensing apparatus according to this embodiment.

FIG. 7 is a diagram showing a first example of the construction of an optical low-pass filter according to this embodiment.

Figure 37:
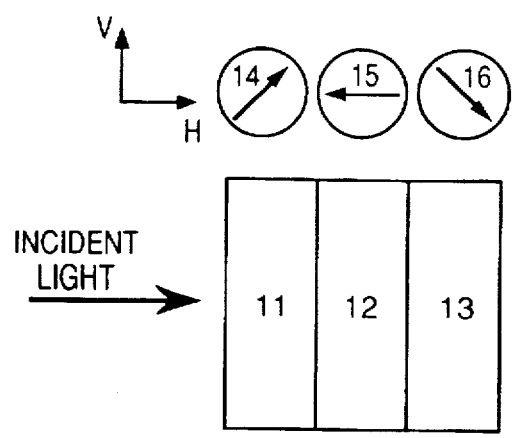
FIG. 37 is a diagram showing an example of the construction of an optical low-pass filter according to the prior art.

As shown in FIG. 7, the third birefringence plate 13 in the typical optical low-pass filter of FIG. 37 is rotated through a predetermined angle of 45°(decided from characteristics, such as the separation distance and direction of the incident light, of the elements constructing the optical low-pass filter) relative to the first birefringence plate 11 and second birefringence plate 12.

At this time the birefringence plate 13 separates the incident light into ordinary and extraordinary light rays, and a principal plane of polarization 16 approximately coincides with the horizontal scanning direction H in a direction perpendicular to the plane of the drawing in which the ordinary and extraordinary light rays exist.

In this case, the arrangement is such that the separation direction of the ordinary and extraordinary rays of the third birefringence plate 13 is made opposite that of the ordinary and extraordinary rays of the second birefringence plate 12.

Let d1 represent the separation distance between the ordinary and extraordinary light rays of the birefringence plates 11 and 13, and let d2 represent the separation distance between the ordinary and extraordinary light rays of the birefringence plate 12. In this case, the results obtained by separation of the incident light are as shown in the explanatory view of FIG. 8 owing to the combination of the three birefringence plates 11, 12 and 13 shown in FIG. 7.

Figure 8:
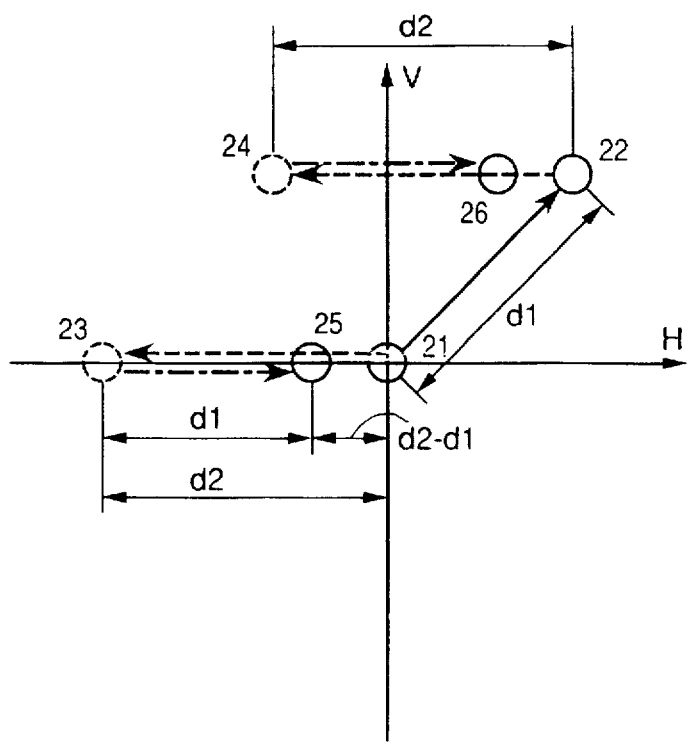
FIG. 8 is a diagram showing the results of separating incident light by the optical low-pass filter shown in FIG. 7.

In FIG. 8, one light ray (21) incident at the origin is separated over the distance d1 in a direction at an angle of 45° to the horizontal scanning direction by means of the first birefringence plate 11, whereby two light rays (21, 22) of approximately equal intensity are obtained. Next, these light rays are each separated over the distance d2 in a direction parallel to the horizontal scanning direction by the second birefringence plate 12, whereby four light rays (21, 22, 23, 24) of approximately equal intensity are obtained.

These light rays are incident upon the third birefringence plate 13 so that two light rays (23, 24) are separated into four light rays (21, 22, 25, 26) of approximately equal intensity by moving them in directions which cancel out the separation distance d2 of the second birefringence plate 12 and the separation distance d1 of the third birefringence plate 13.

Figure 9A:
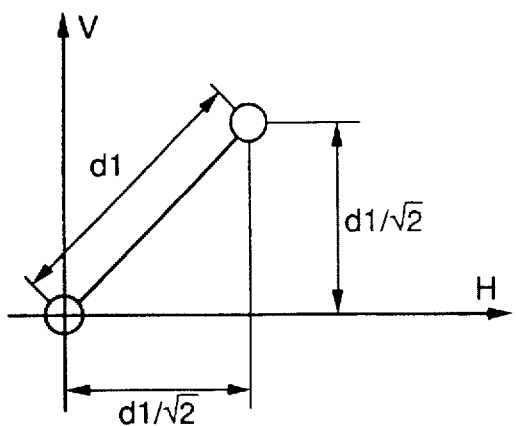
FIGS. 9A, 9B are diagrams showing separation distance and direction of the results of separating incident light depicted in FIG. 8.
Figure 9B:
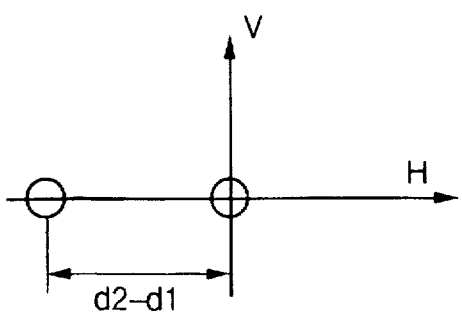

If a general solution is found to the spatial frequency characteristics when use is made of such an optical low-pass filter, this can be thought of as a combination of an optical low-pass filter which separates light into ordinary and extraordinary light rays over the distance $d1/\sqrt{2}$ in the horizontal direction H and the distance $d1/\sqrt{2}$ in the vertical direction V, as shown in FIG. 9A illustrating separation distance and direction, and an optical low-pass filter which separates light into ordinary and extraordinary light rays over the distance (d2–d1) in the horizontal direction, as shown in FIG. 9B.

The optical low-pass filter of FIG. 9A has a frequency characteristic in the shape of a COS curve having a trap point at a point which is an odd-number multiple of (½)·[ph/(d1/√2)] normalized at ph/2π in the horizontal direction. In the vertical direction, the optical low-pass filter of FIG. 9A has a frequency characteristic in the shape of a COS curve having a trap point at a point which is an odd-number multiple of (½)·[pv/(d1/√2)] normalized at pv/2π. The optical low-pass filter of FIG. 9B has a frequency characteristic in the shape of a COS curve having a trap point at a point which is an odd-number multiple of (½)·[ph/(d2-d1)] in the horizontal direction.

Accordingly, a general solution to the horizontal-direction spatial frequency characteristic (fx) of the optical low-pass filter having the above-described construction is as follows where d2# d1:

$$F2(fx) = \cos[\pi \cdot (d2-d1) \cdot fx/ph] \times \cos[(\pi \cdot d1/\sqrt{2}) \cdot (fx/ph)]$$

When d2=d1 holds, the frequency characteristic is $$F2(fx) = \cos[(\pi \cdot d1/\sqrt{2}) \cdot (fx/ph)]$$

Further, a general solution to the vertical-direction spatial frequency characteristic F2(fy) is the frequency characteristic $$F2(fy) = \cos[(\pi \cdot d1/\sqrt{2}) \cdot (fy/pv)]$$

Figure 12:
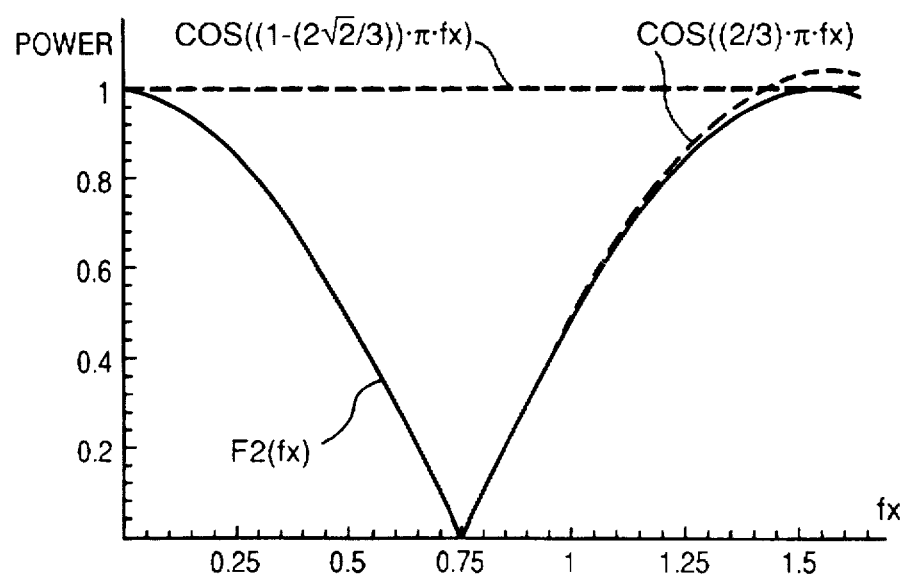
FIG. 12 is a diagram showing a horizontal spatial frequency spectrum of the optical low-pass filter shown in FIG. 7.

FIG. 12 illustrates a horizontal-direction spatial frequency spectrum in a case where ph and pv are assumed to be approximately equal values, e.g., when d2=ph, d1/√2=(⅔)·ph=⅔·pv are assumed to hold.

In FIG. 12, a curve F2(fx), which is the result of combining the curve of $\cos[(1-2\sqrt{2/3})]$ indicated by he dashed line and the curve of $\cos[(⅔)\cdot\pi\cdot fx]$ indicated by the dashed line, is the sought spatial frequency spectrum in the horizontal direction. The equation is expressed by the following:

$$F2(fx) = \cos[(1 - 2\sqrt{2/3}) \cdot \pi \cdot fx] \cdot \cos[(2/3) \cdot \pi \cdot fx]$$

Figure 13:
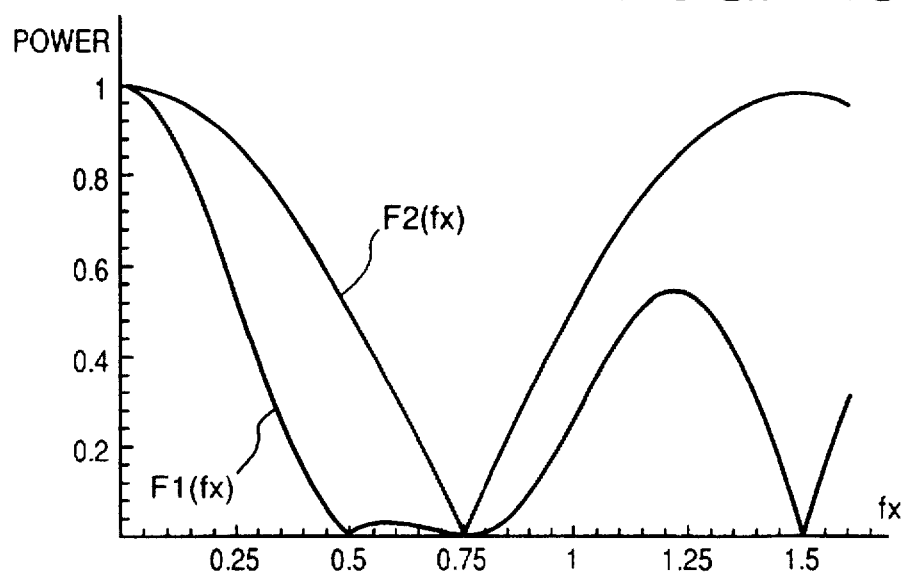
FIG. 13 is a diagram showing a comparison of horizontal spatial frequency spectra.

FIG. 13 is a diagram showing a comparison of horizontal spatial frequency spectra.

Figure 38:
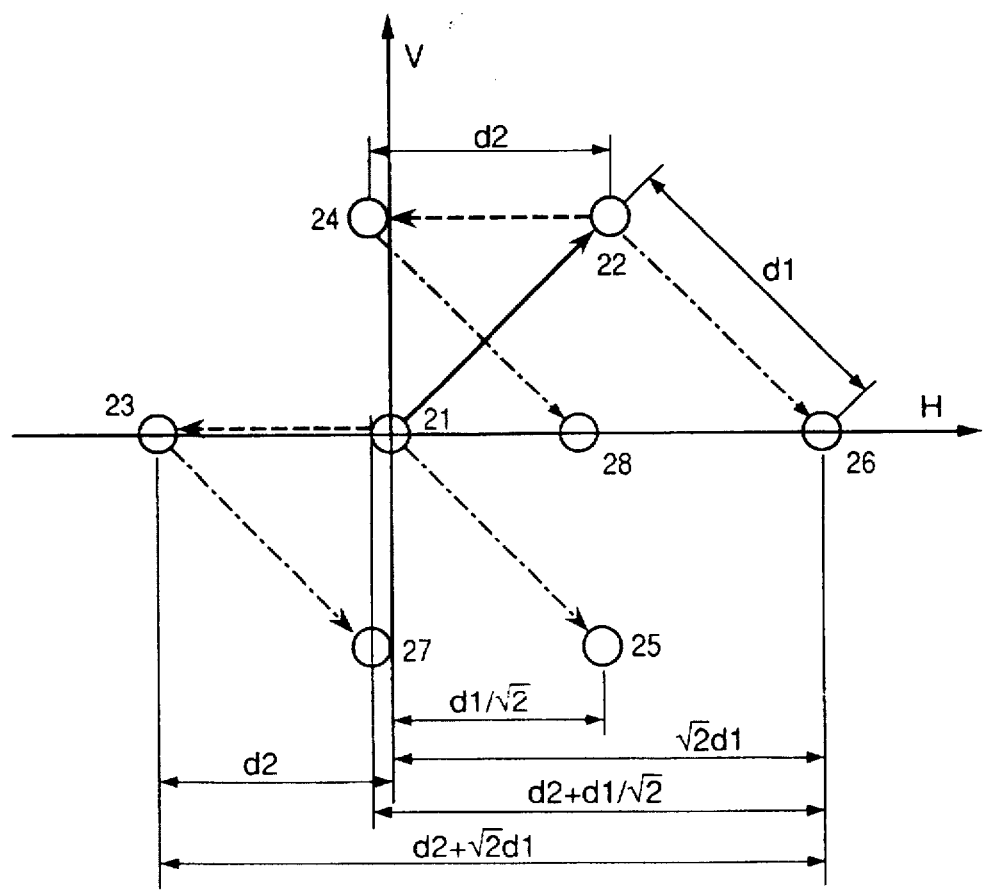
FIG. 38 is a diagram showing the results of separating incident light by the prior art shown in FIG. 29.
Figure 39A:
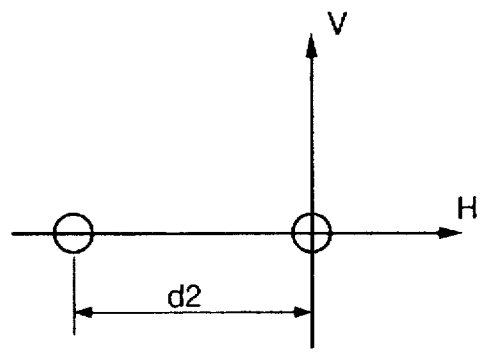
FIGS. 39A, 39B are diagrams showing separation distance and direction of the results of separating incident light depicted in FIG. 30.
Figure 39B:
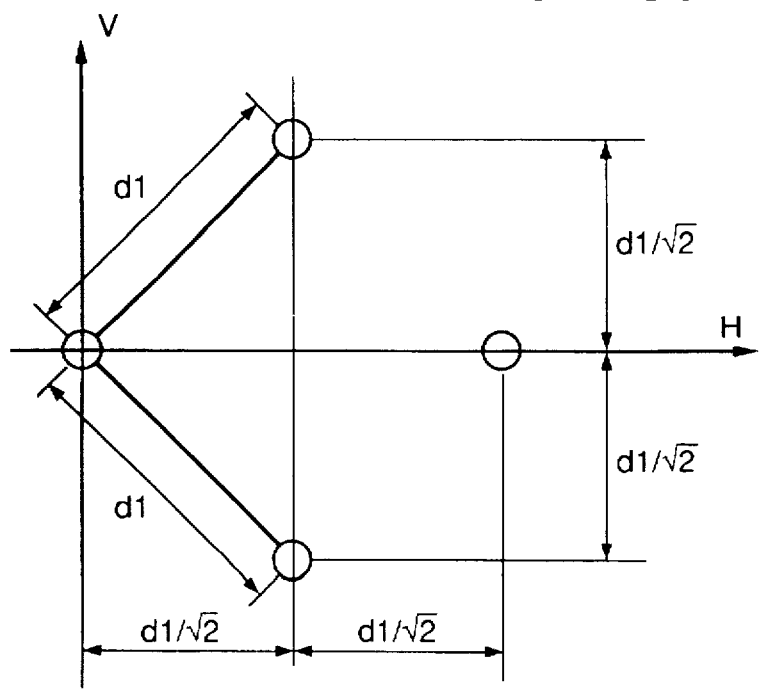
Figure 40:
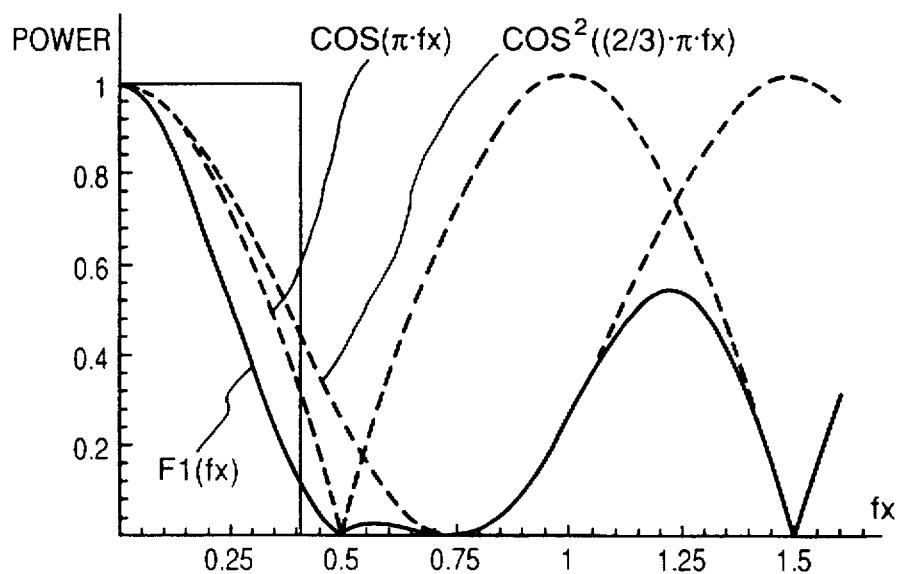
FIG. 40 is a diagram showing a horizontal spatial frequency spectrum of the prior art shown in FIG. 29.

More specifically, FIG. 13 illustrates a comparison of the horizontal spatial frequency spectrum $F1(fx)=\cos(\pi \cdot fx) \times \cos^2[(⅔)\cdot\pi\cdot fx]$ of the optical low-pass filter shown in FIG. 38, which is an example of the prior art, and the horizontal spatial frequency spectrum $F2(fx)=\cos[(1-2\sqrt{2/3})\cdot\pi fx]\cdot\cos[(⅔)\cdot\pi\cdot fx]$ of the optical low-pass filter shown in FIG. 7.

It will be obvious from FIG. 13 that rotating all or part of the optical low-pass filter about the approximate photographic optic axis makes it possible to change the cut-off characteristic of the optical low-pass filter. Attenuation of the high-frequency components of the spatial frequency is prevented by a simple expedient, namely rotating all or part of the optical low-pass filter, which has the cut-off characteristic F1(fx) suited to photography of a color natural image, about the approximate photographic optic axis. As a result, the cut-off characteristic F2(fx), which is appropriate in terms of capturing a monochromatic image, is obtained.

Figure 14:
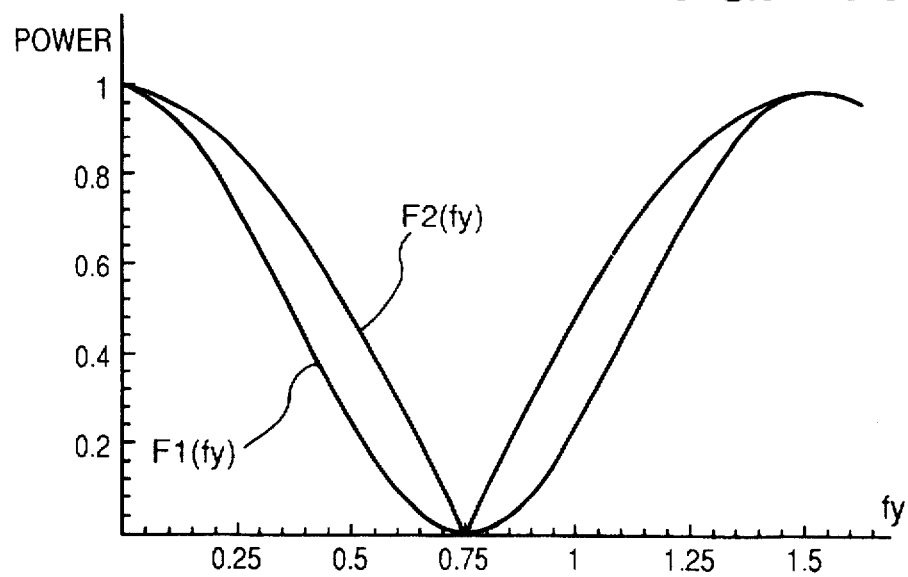
FIG. 14 is a diagram showing a comparison of vertical spatial frequency spectra.

FIG. 14 is a diagram showing a comparison of vertical spatial frequency spectra.

Figure 41:
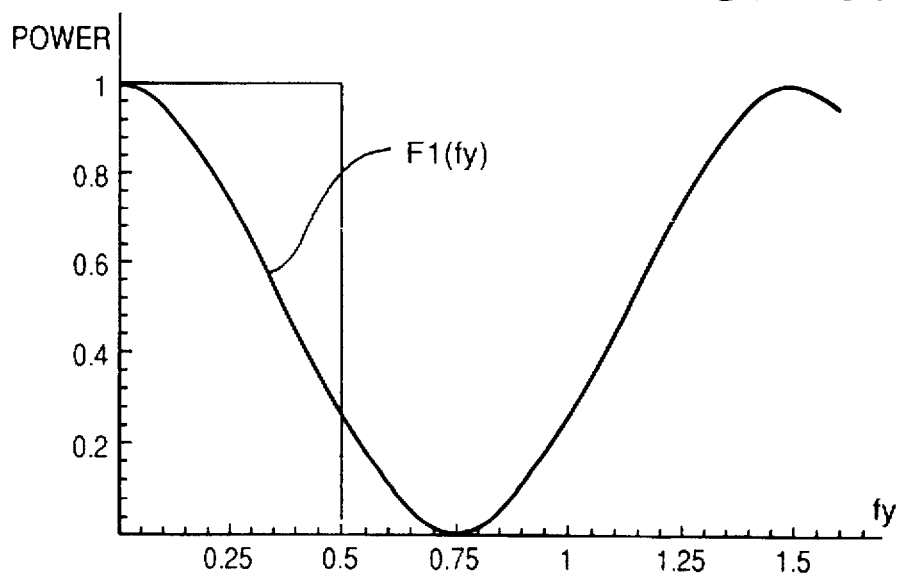
FIG. 41 is a diagram showing a vertical spatial frequency spectrum of the prior art shown in FIG. 29.
Figure 42:
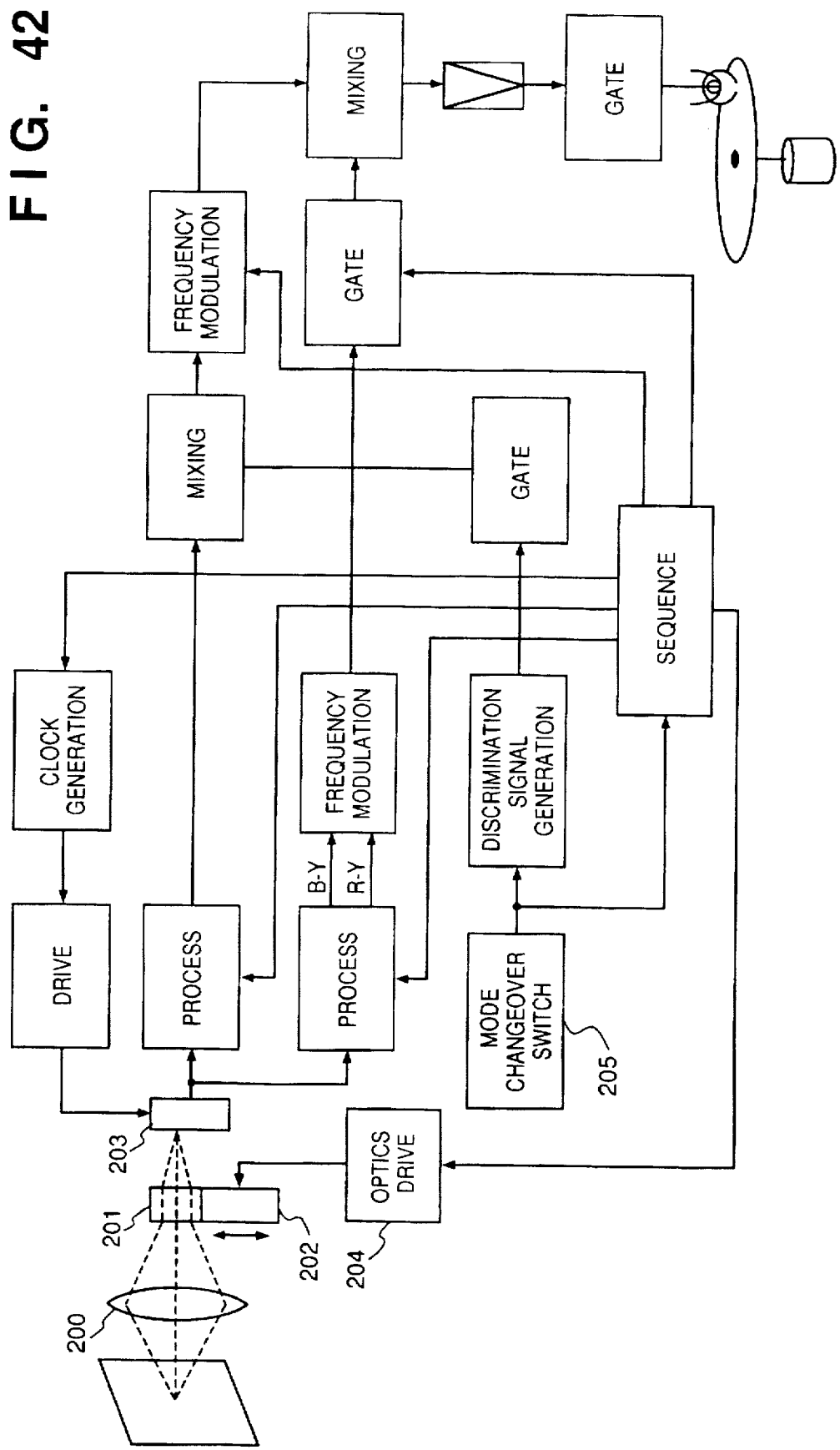
FIG. 42 is a block diagram showing an image recording system according to the prior art.

More specifically, FIG. 14 illustrates a comparison of the vertical spatial frequency spectrum of F1(fy) in the prior art example of FIG. 41 and the vertical spatial frequency spectrum of F2(fy) of this embodiment. The effects in the vertical direction are similar to those in the horizontal direction.

Figure 10:
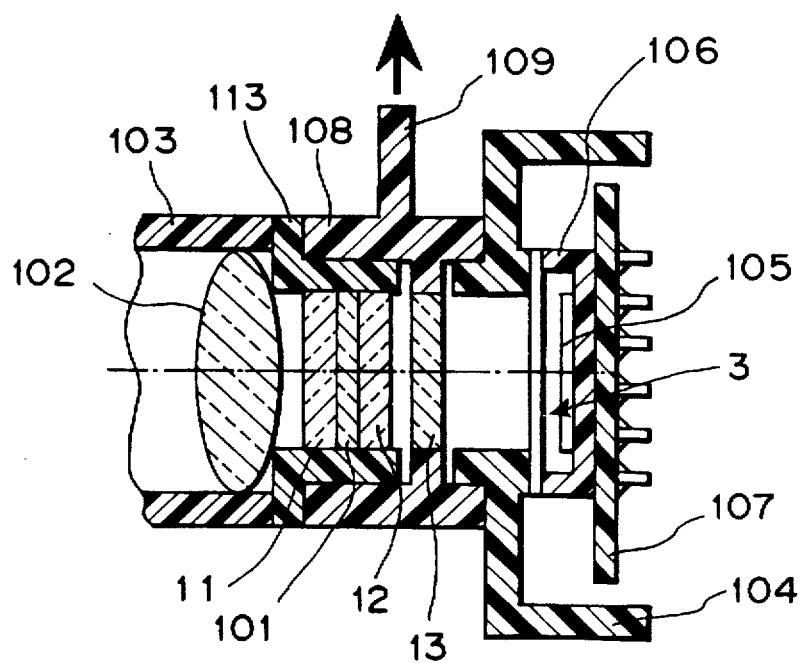
FIG. 10 is a sectional view of a mechanism for rotating the optical low-pass filter shown in FIG. 7.
Figure 11:
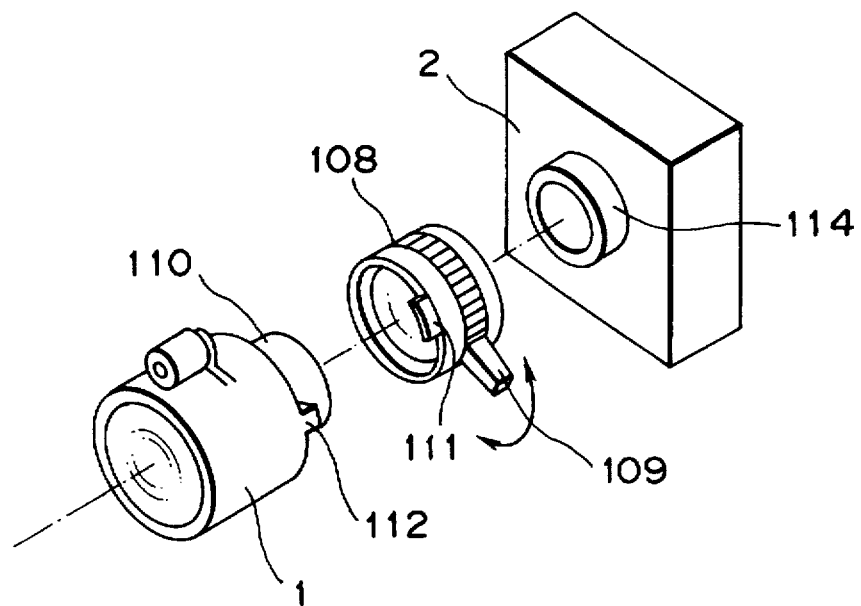
FIG. 11 is a perspective view showing the rotating mechanism illustrated in FIG. 10.

FIGS. 10 and 11 are diagrams illustrating the mechanism for rotating the optical low-pass filter of this embodiment, in which FIG. 10 is a sectional view of the rotating mechanism and FIG. 11 an exploded perspective view thereof.

As shown in FIGS. 10 and 11, a photographic lens unit 1 is constituted by a photographic lens barrel 103 and a rear lens 102. Attached to the rear of the photographic lens unit 1 is an optical low-pass filter fixing member 113 for fixedly holding the first birefringence plate 11, an infrared cut-off filter 101 and a second birefringence plate 12.

An image sensing unit 3 includes an image sensing element 105 mounted on an image sensing package 106. The unit 3 is soldered on and connected to a substrate 107 and the leads thereof are led to the outside by a flexible board (not shown). An imaging unit 2 comprises the image sensing unit 3 and an element holder 104 for optically positioning the image sensing unit 3 and the photographic lens unit 1.

A member 108 for turning the optical low-pass filter fixedly holds the third birefringence plate 13. A protruding cylindrical portion 110 of the optical low-pass filter fixing member 113 and a protruding cylindrical portion 114 of the holder 104 are both inserted into the turning member 108 so as to come into intimate contact with the inner wall surface of the turning member. The arrangement is such that the turning member 108 may be rotated to positions suited to a color natural-image mode and a monochromatic image mode by mode changeover means (not shown) through the intermediary of a transmission member 109.

The member 108 for turning the optical low-pass filter is capable of being provided with an excellent sealed structure by inserting the protruding cylindrical portions 110 and 114, thereby making it possible to prevent the penetration of dust and intrusion of light resulting from leakage.

Numerals 111 and 112 denotes projections formed on the turning member 108 and fixing member 113, respectively. These serve as stoppers for stopping rotation at the appropriate positions for the color natural-image mode and monochromatic image mode.

By virtue of this arrangement, the color natural-image mode or monochromatic image mode is set by the photographer, whereby the turning member 108 is rotated (the third birefringence plate 13 is rotated) via the transmission member 109 in operative association with the mode changeover means (not shown) and is stopped at the appropriate position by the stopper means 111, 112.

Figure 15:
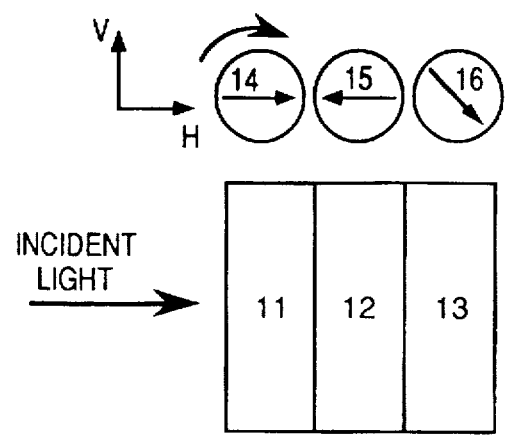
FIG. 15 is a diagram illustrating an example of the construction of an optical low-pass filter according to a second embodiment of the present invention.

FIG. 15 illustrates a second example of the construction of the optical low-pass filter.

In the previous embodiment, the cut-off characteristic of the optical low-pass filter is changed by an arrangement in which the third birefringence plate 13 is rotated through an angle of 45° relative to the first and second birefringence plates 11, 12, which are held fixed. In the second embodiment illustrated in FIG. 15, the first birefringence plate 11 is rotated through a predetermined angle (decided from characteristics, such as the separation distance and direction of the incident light, of the elements constructing the optical low-pass filter) in a predetermined direction. In other words, the birefringence plate 11 is rotated by −45°.

The horizontal and vertical spatial frequency characteristics are the same as shown in FIGS. 12, 13 and 14 of the preceding embodiment. Though the frequency characteristics in the diagonal direction of the image are different, the cut-off characteristic indicates effects similar to those of the first embodiment. In the second embodiment, the second and third birefringence plates 12, 13 are held fixed. An advantage obtained is that the sealing structure in the vicinity of the image forming surface is made more reliable.

Figure 16:
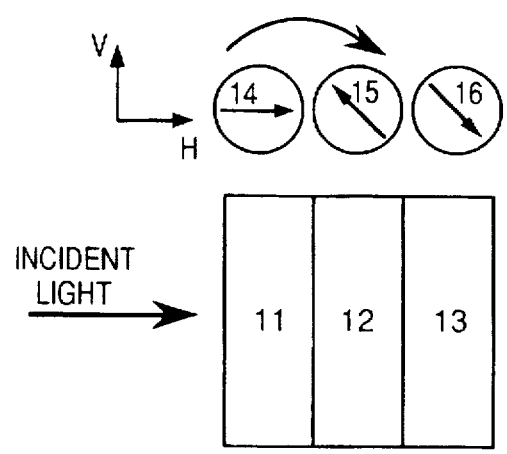
FIG. 16 is a diagram illustrating an example of the construction of an optical low-pass filter according to a third embodiment of the present invention.

FIG. 16 illustrates a third example of the construction of the optical low-pass filter.

In the third embodiment shown in FIG. 16, the conditions imposed are d1=d2, as in the second embodiment of FIG. 15. Under these conditions, the third birefringence plate 13 is held fixed and the first and second birefringence plates 11, 12 are co-rotated through a predetermined angle in the predetermined direction (clockwise in FIG. 15), i.e., through an angle of −45°. When this is done, an optical low-pass filter having a trap point solely in the horizontal direction can be constructed.

Figure 17:
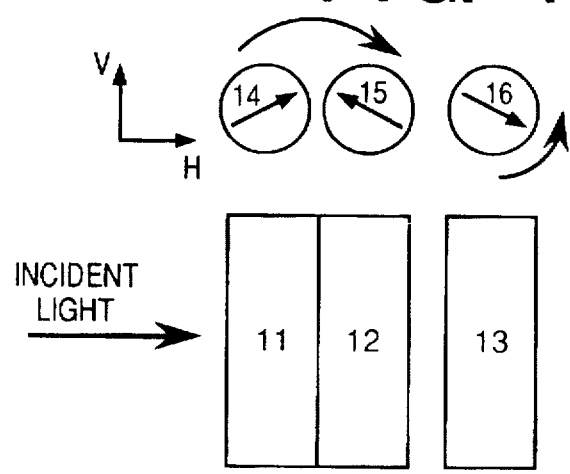
FIG. 17 is a diagram illustrating an example of the construction of an optical low-pass filter according to a fourth embodiment of the present invention.

FIG. 17 illustrates a fourth example of the construction of the optical low-pass filter.

Figure 18:
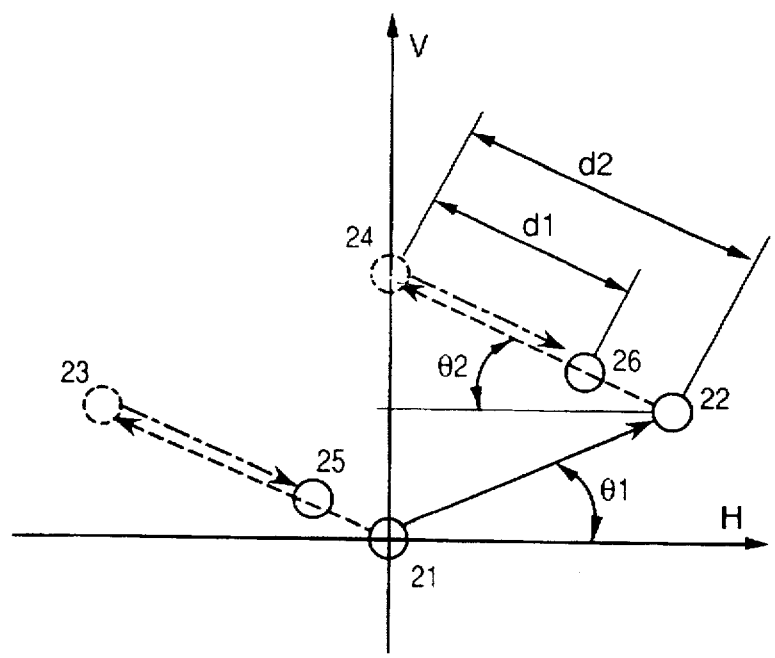
FIG. 18 is a diagram showing the results of separating incident light by the optical low-pass filter shown in FIG. 17.

FIG. 18 is a diagram showing the results of separating incident light by the optical low-pass filter shown in FIG. 17.

Figure 19A:
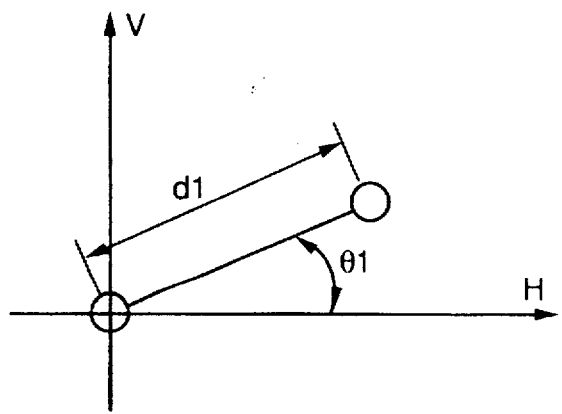
FIGS. 19A, 19B are diagrams showing separation distance and direction of the results of separating incident light depicted in FIG. 18.
Figure 19B:
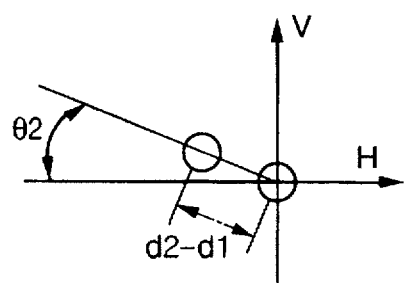

FIGS. 19A, 19B are diagrams showing separation distance and direction of the results of separating incident light depicted in FIG. 18.

In FIG. 17, the first and second birefringence plates 11 and 12 are co-rotated through a fixed angle (decided from characteristics, such as the separation distance and direction of the incident light, of the elements constructing the optical low-pass filter), i.e., through an angle of −22.5°, and the third birefringence plate 13 also is rotated through a fixed angle in the opposite direction, i.e., through an angle of 22.5°.

In this case, the separation distances of the ordinary and extraordinary rays of the second and third birefringence plates 12, 13 act so as to offset each other, and the light rays separated from the incident light ray become four in all (21, 22, 25, 26), as shown in FIG. 18. This is the result of a combination of the component of the light rays whose angle θ1 is 22.5° and whose separation distance is d1, as shown in FIG. 19A, and the component of the light rays whose angle θ2 is 22.5° and whose separation distance is d2−d1), as shown in FIG. 19B. The same effects are obtained in terms of the cut-off characteristic.

Figure 20:
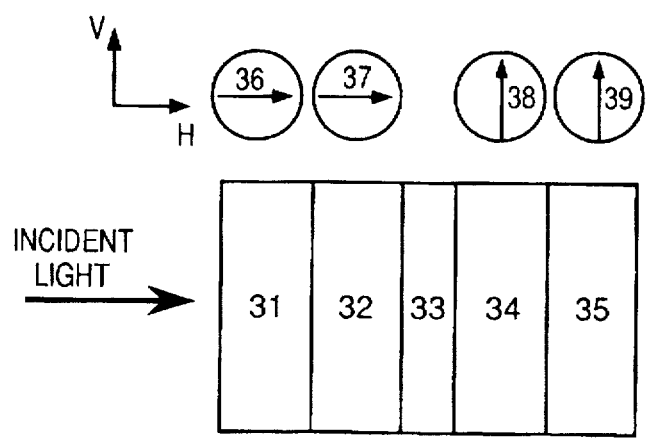
FIG. 20 is a diagram illustrating an example of the construction of an optical low-pass filter according to a fifth embodiment of the present invention.
Figure 21:
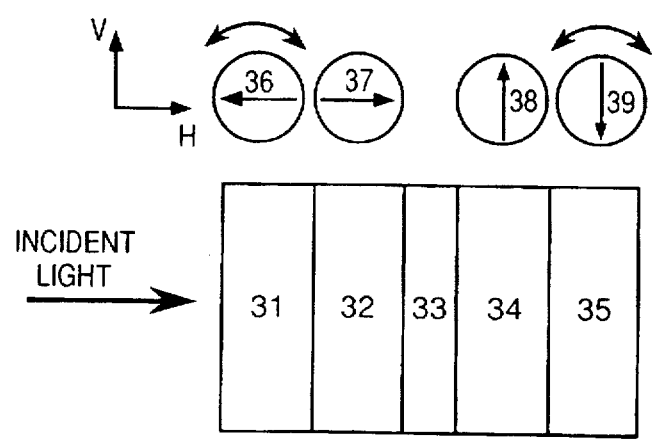
FIG. 21 is a diagram showing an example of the rotary elements of the optical low-pass filter depicted in FIG. 20.

FIGS. 20 and 21 illustrate a fifth example of the construction of the optical low-pass filter.

Figure 22:
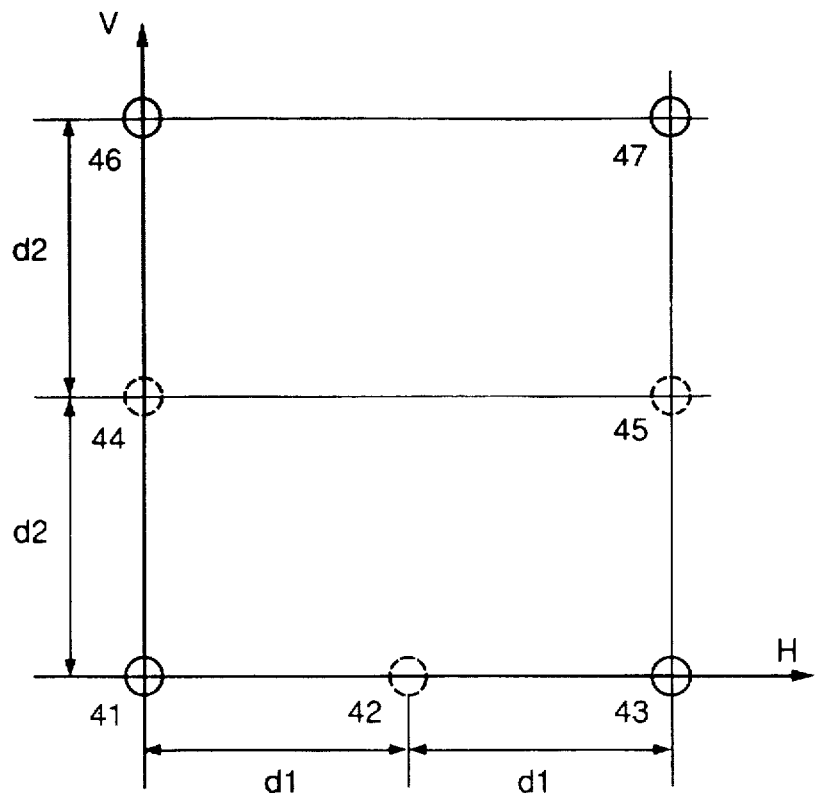
FIG. 22 is a diagram showing the results of separating incident light by the optical low-pass filter shown in FIG. 20.

FIG. 22 is a diagram showing the results of separating incident light.

In FIG. 20, four birefringence plates 31, 32, 34, 35 for obtaining a cut-off characteristic in a case where a color natural image is captured are provided, as opposed to the arrangement of the optical low-pass filter composed of three birefringence plates in the each of the foregoing embodiments.

In FIG. 20, the birefringence plates 31, 32 separate incident light into ordinary and extraordinary light rays, and principal planes of polarization 36, 37 in which these ordinary and extraordinary rays exist coincide with the horizontal scanning direction H. The separation directions of the ordinary and extraordinary rays also are the same.

The ordinary and extraordinary light rays possessing polarized components owing to the birefringence plates 31 and 32 are rendered unpolarized by a phase plate 33. The resulting light rays do not possess specific polarized components, just as in the case of natural light.

The birefringence plates 34 and 35 separate incident light into ordinary and extraordinary light rays, and main polarization plates 38, 39 in which these ordinary and extraordinary light rays exist approximately coincide with the vertical scanning direction V. The separation directions of the ordinary and extraordinary light rays also are made the same.

Assume a case in which d1 represents the separation distance of the ordinary and extraordinary light rays of the birefringence plates 31 and 32, and d2 represents the separation distance of the ordinary and extraordinary light rays of the birefringence plates 34 and 35. The results of separating the incident light by this combination of four birefringence plates 31, 32, 34, 35 and one phase plate 33 are as illustrated in FIG. 22.

In FIG. 22, one light ray (41) incident at the origin has its ordinary and extraordinary light rays separated over the distance d1 in the horizontal scanning direction, whereby two light rays (41, 42) of approximately equal intensity are obtained. Next, these light rays are each separated again over the distance d1 in the same separation direction parallel to the horizontal scanning direction by the second birefringence plate 32. That is, the light ray (42) is moved to the light ray (43) over the distance d1 to obtain two light rays (41, 43) of approximately equal intensity.

Next, these light rays each have their ordinary and extraordinary light rays separated over the distance d2 in the vertical scanning direction by the third birefringence plate 34 through the intermediary of the phase plate 33, whereby four light rays (41, 43, 44, 45) of approximately equal intensity are obtained. Next, separation is performed again over the distance d2 in the same separation direction in the vertical scanning direction by the fourth birefringence plate 35.

That is, the light rays (44, 45) are moved to the light rays (46, 47) over the distance d2 to obtain four light rays (41, 43, 46, 47) of approximately equal intensity. Accordingly, by appropriately selecting the separation distances d1 and d2, a cut-off characteristic having little cross color and moiréis obtained.

FIG. 21 illustrates the construction of the optical low-pass filter in which the birefringence plates in FIG. 20 are rotated.

In the case of FIG. 21, the second and third birefringence plates 32, 34 are held fixed and the first and fourth birefringence plates 31, 35 are rotated through a predetermined angle of 180°(a predetermined angle decided from characteristics, such as the separation distance and direction of the incident light, of the elements constructing the optical low-pass filter). Here the first and second birefringence plates 31, 32 are such that the separation distances d1 are equal and the separation directions are exactly opposite. As a result, light rays once separated into ordinary and extraordinary light rays by the first birefringence plate 31 become unpolarized again owing to the second birefringence plate 32.

The foregoing holds for the third and fourth birefringence plates 34, 35 as well. Accordingly, the rotated optical low-pass filter of FIG. 21 is equivalent to a transparent optical member in which light rays are not separated and which does not perform the function of an optical low-pass filter. As for the spatial frequency, a flat characteristic in which absolutely no high-frequency components drop out is obtained. Thus, the optimum characteristic for the monochromatic image mode is obtained.

Figure 23:
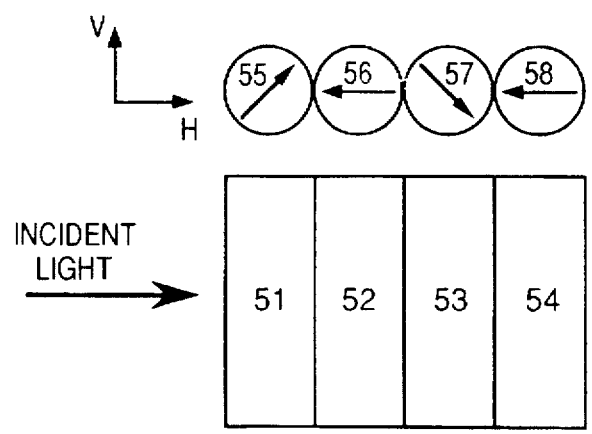
FIG. 23 is a diagram illustrating an example of the construction of an optical low-pass filter according to a sixth embodiment of the present invention.
Figure 24A:
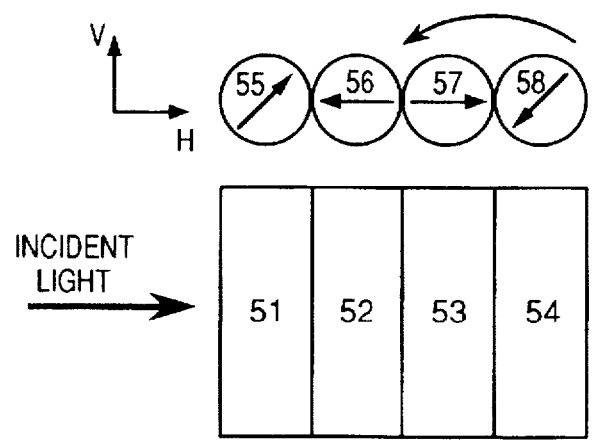
FIGS. 24A, 24B diagrams showing an example of the rotary elements of the optical low-pass filter depicted in FIG. 23.
Figure 24B:
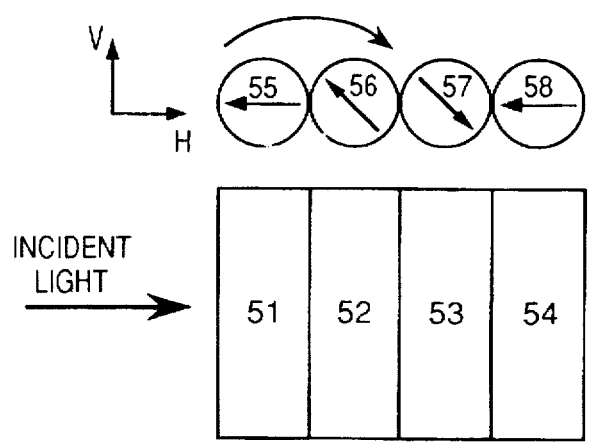

FIG. 23 and FIGS. 24A, 24B illustrate a sixth example of an optical low-pass filter.

FIG. 23 illustrates an example in which an optical low-pass filter for a color natural image is constructed by four birefringence plates without using a phase plate. A birefringence plate 51 separates incident light into ordinary and extraordinary light rays, and a principal polarization plane 55 forms an angle of approximately 45°, with respect to the horizontal scanning direction H, in a direction perpendicular to plane of the drawing in which these ordinary and extraordinary light rays exist.

Birefringence plates 52, 54 separate incident light into ordinary and extraordinary light rays, and principal polarization planes 56, 58 in which these ordinary and extraordinary light rays exist approximately coincide with the horizontal scanning direction. A birefringence plate 53 separates incident light into ordinary and extraordinary light rays, and a principal polarization plane 57 in which these ordinary and extraordinary light rays exist forms an angle of about −45° with respect to the horizontal scanning direction.

Let d1 represent the separation distance between the ordinary and extraordinary light rays of the birefringence plates 51 and 53, let d2 represent the separation distance between the ordinary and extraordinary light rays of the birefringence plate 52, and let d4 represent the separation distance between the ordinary and extraordinary light rays of the birefringence plate 54. In this case, the arrangement of the birefringence plates 51, 52, 53 is exactly the same as that of the conventional low-pass filter composed of three birefringence plates shown in FIG. 37. The incident light is separated into eight light rays in a manner similar to that shown in FIG. 38.

Figure 25:
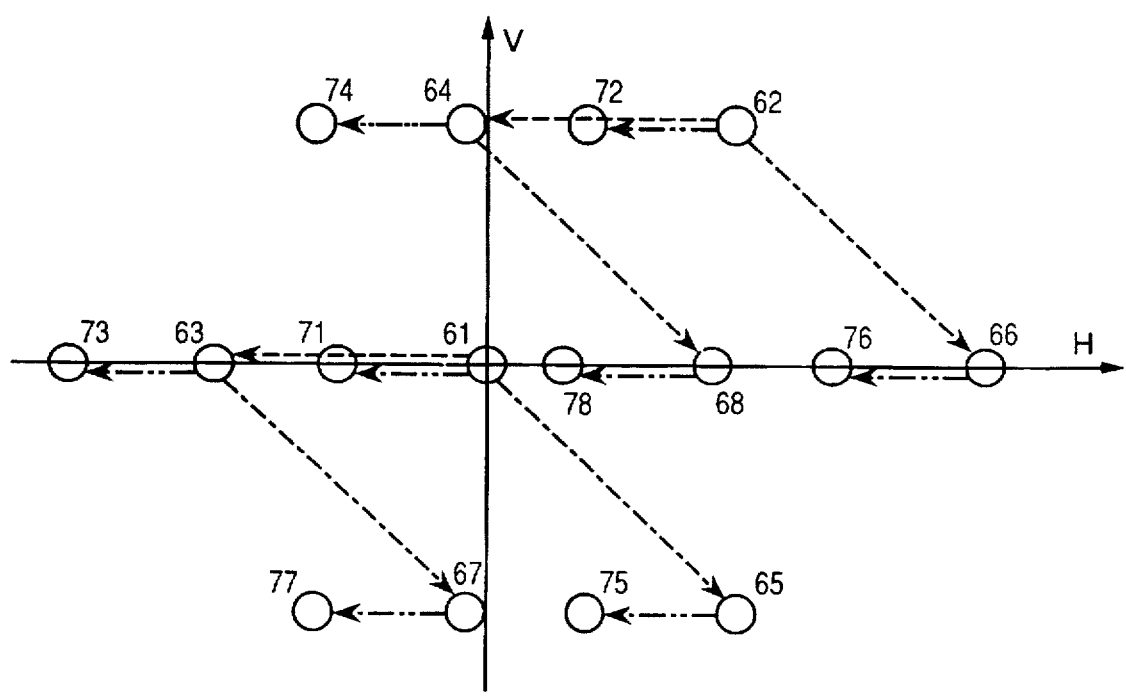
FIG. 25 is a diagram showing the results of separating incident light by the optical low-pass filter shown in FIG. 23.

These eight light rays are each separated over the distance d4 parallel to the horizontal scanning direction by the birefringence plate 54, whereby 16 light rays (61, 62, 63, 64, 65, 66, 67, 68, 71, 72, 73, 74, 75, 76, 77, 78) of equal intensity are obtained, as illustrated in FIG. 25 showing the results of separation of incident light. Accordingly, by suitably selecting the separation distances d1, d2, d3, the horizontal cutoff characteristic is improved over that of the conventional optical low-pass filter composed of three plates shown in FIG. 37.

In FIGS. 24A, 24B, a characteristic at the time of a monochromatic image is obtained by rotating the birefringence plates of the optical low-pass filter shown in FIG. 23.

In FIG. 24A, the third and fourth birefringence plates 53, 54 are co-rotated through an angle of 45° (a predetermined fixed angle decided from characteristics, such as the separation distance and direction of the incident light, of the elements constructing the optical low-pass filter).

In FIG. 24B, the first and second birefringence plates 51, 52 are co-rotated through a predetermined fixed angle of −45°.

If it is assumed that the separation distance d2 based upon the second birefringence plate 52 and the separation distance d1 based upon the third birefringence plate 53 are equal, the characteristic of the low-pass filter is decided by the separation distance (d1−d4) based upon the first and fourth birefringence plates 51, 54 because the two separation directions are opposite each other.

Figure 26A:
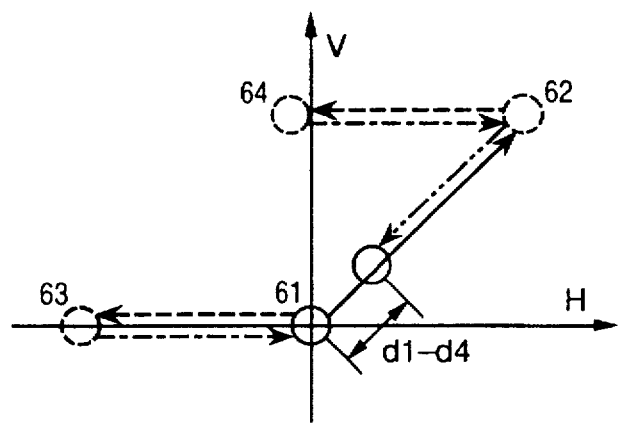
FIGS. 26A, 26B are diagrams showing the results of separating incident light by the optical low-pass filter shown in FIG. 25.
Figure 26B:
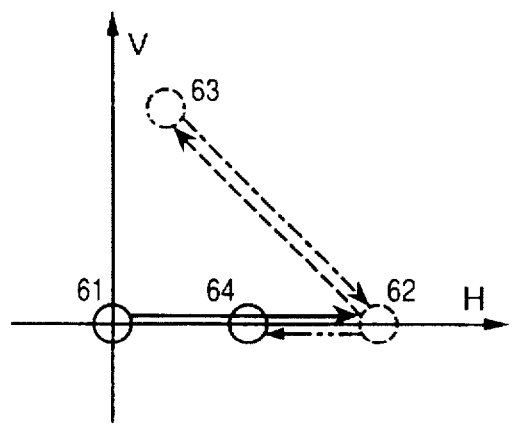

FIG. 26A illustrates the results of separating the incident light by the arrangement of FIG. 24A, and FIG. 26B illustrates the results of separating the incident light by the arrangement of FIG. 24B. The smaller the separation distance (d1−d2), the more the trap point of the low-pass filter is shifted to the high-frequency side to obtain a spatial frequency characteristic suited to the monochromatic image mode.

Accordingly, as in the foregoing embodiment, by making the separation distance d1 based upon the first birefringence plate 51 and the separation distance d1 based upon the fourth birefringence plate 54 equal in FIGS. 24A, 24B, the effects of the low-pass filter can be completely eliminated by rotation.

In this case, a rotating mechanism composed of a single member suffices in comparison with the foregoing embodiment composed of four plates. This makes it possible to avoid an increase in the size of the apparatus.

Figure 27:
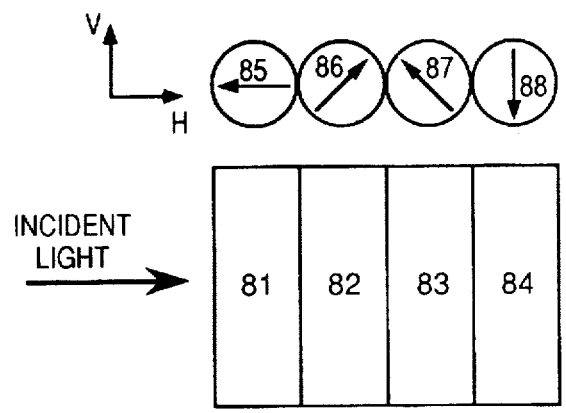
FIG. 27 is a diagram illustrating an example of the construction of an optical low-pass filter according to a seventh embodiment of the present invention.
Figure 29:
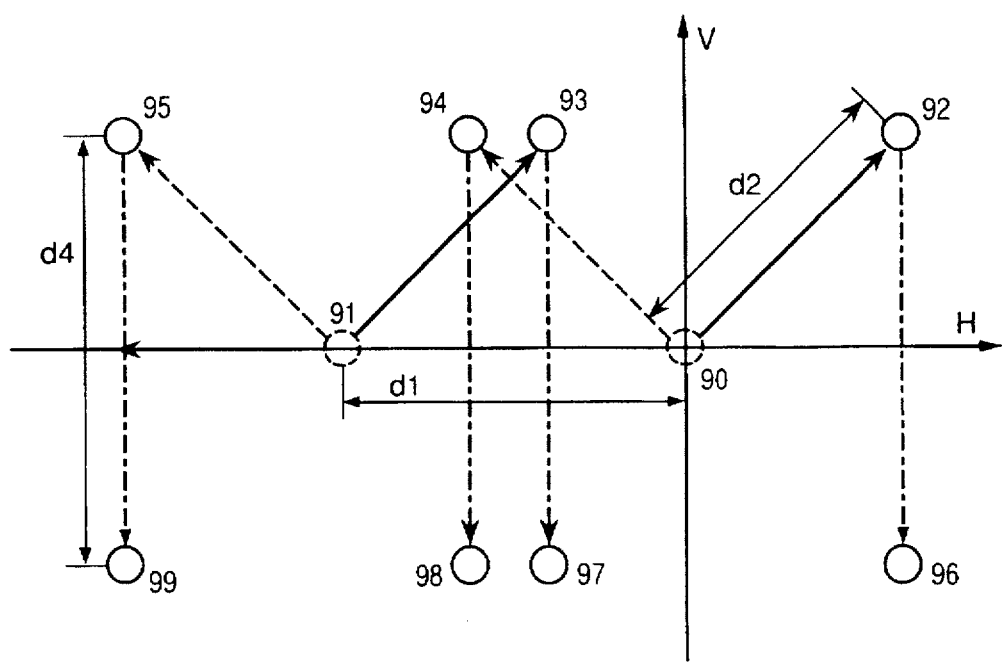
FIG. 29 is a diagram showing the results of separating incident light by the optical low-pass filter shown in FIG. 27.
Figure 28A:
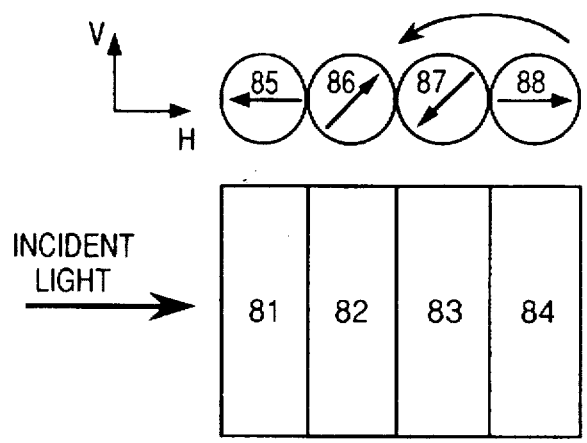
FIGS. 28A, 28B diagrams showing an example of the rotary elements of the optical low-pass filter depicted in FIG. 27.
Figure 28B:
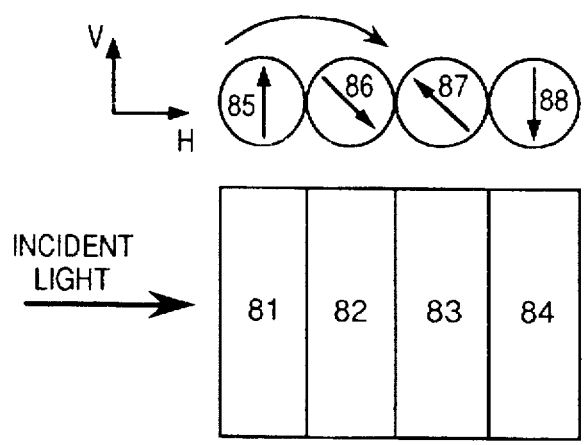
Figure 30A:
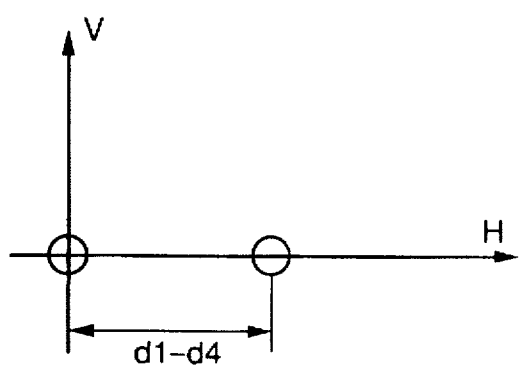
FIGS. 30A, 30B are diagrams showing the results of separating incident light by the optical low-pass filter shown in FIG. 25.
Figure 30B:
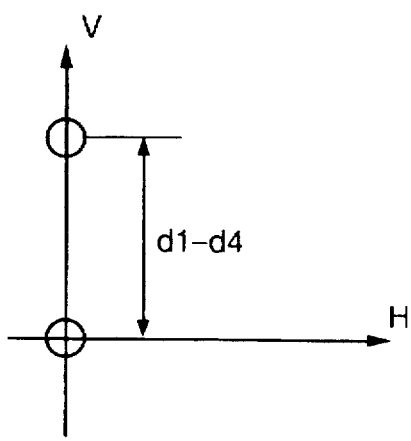

FIG. 27 and FIGS. 28A, 28B illustrate a seventh example of an optical low-pass filter. FIG. 27 illustrates an optical low-pass filter composed of four plates for obtaining a cut-off characteristic in a case where a color natural image is captured. FIG. 29 illustrates the results of separating incident light by the optical low-pass filter of FIG. 27, and FIGS. 30A, 30B illustrates the results of separating incident light by the optical low-pass filter of FIGS. 28A, 28B.

A first birefringence plate 81 separates incident light into ordinary and extraordinary light rays, and a principal polarization plane 55 approximately coincides with the horizontal scanning direction H in a direction perpendicular to plane of the drawing in which these ordinary and extraordinary light rays exist. Second and third birefringence plates 82, 83 separate incident light into ordinary and extraordinary light rays, and principal polarization planes 86, 87 in which these ordinary and extraordinary light rays exist for angles of approximately 45° and 135°, respectively, with respect to the horizontal scanning direction. A fourth birefringence plate 84 separates incident into ordinary and extraordinary light rays, and a principal polarization plane 88 in which these ordinary and extraordinary rays exist agrees with the vertical scanning direction V.

Let d1 represent the separation distance between the ordinary and extraordinary light rays of the first birefringence plate 81, let d2 represent the separation distance between the ordinary and extraordinary light rays of the second and third birefringence plates 82, 83, and let d4 represent the separation distance between the ordinary and extraordinary light rays of the fourth birefringence plate 84. In this case, the incident light ray is separated into eight light rays (92, 93, 94, 95, 96, 97, 98, 99) of equal intensity, as illustrated in FIG. 29 showing the results of separation of incident light.

FIGS. 28A, 28B illustrate an arrangement in which a cut-off characteristic at the time of a monochromatic image is obtained by rotating the optical low-pass filter shown in FIG. 27.

In FIG. 28A, the third and fourth birefringence plates 83, 84 are co-rotated through a predetermined fixed angle of 90°.

In FIG. 28B, the first and second birefringence plates 81, 82 are co-rotated through a predetermined fixed angle of −90°.

Since the separation distance based upon the second birefringence plate 82 and the separation distance based upon the third birefringence plate 83 are equal and the two separation directions are opposite each other, the effects of the low-pass filter are decided by separation distance (d1−d4) based upon the first and fourth birefringence plates 81, 84.

FIG. 28A illustrates the results of separating the incident light by the arrangement of FIG. 28A, and FIG. 28B illustrates the results of separating the incident light by the arrangement of FIG. 28B.

The smaller the separation distance (d1–d4), the more the trap point of the low-pass filter is shifted to the high-frequency side to obtain a spatial frequency characteristic suited to the monochromatic image mode.

The exiting light rays obtained in a case where the third and fourth birefringence plates 83, 84 are co-rotated coincide with the horizontal scanning circuit H, and therefore an optical low-pass filter having a low-pass effect only the horizontal scanning direction is obtained. On the other hand, the exiting light rays obtained in a case where the first and second birefringence plates 81, 82 are co-rotated coincide with the vertical scanning circuit V, and therefore an optical low-pass filter having a low-pass effect only the vertical scanning direction is obtained.

Further, as in the foregoing embodiment, by making the separation distance d1 based upon the first birefringence plate 81 and the separation distance d4 based upon the fourth birefringence plate 84 equal in FIGS. 28A, 28B, the effects of the low-pass filter can be completely eliminated by rotation.

Thus, as described above, the cut-off characteristic can be changed by rotating all or part of an optical low-pass filter about an approximate photographic optic axis. As a result, it is possible to provide the mechanism peripheral to the photographic optical path with a much improved sealing structure. This makes it possible to provide an excellent image sensing apparatus in which the penetration of dust and intrusion of light resulting from leakage can be prevented.

Further, it is unnecessary to retract a low-pass filter or an optical member having the same optical path length completely from the optical path; a simple changeover mechanism suffices. The makes it possible to construct the apparatus inexpensively and promotes a reduction in the size of the apparatus.

Further, it is unnecessary to provide wasteful gaps and play in the direction of the photographic optic axis, and there is no need to extend back-focusing unnecessarily. This makes it possible to reduce the size of the photographic optical system and to construct an inexpensive lens optical system for photography.

[Second Embodiment]

Figure 31:
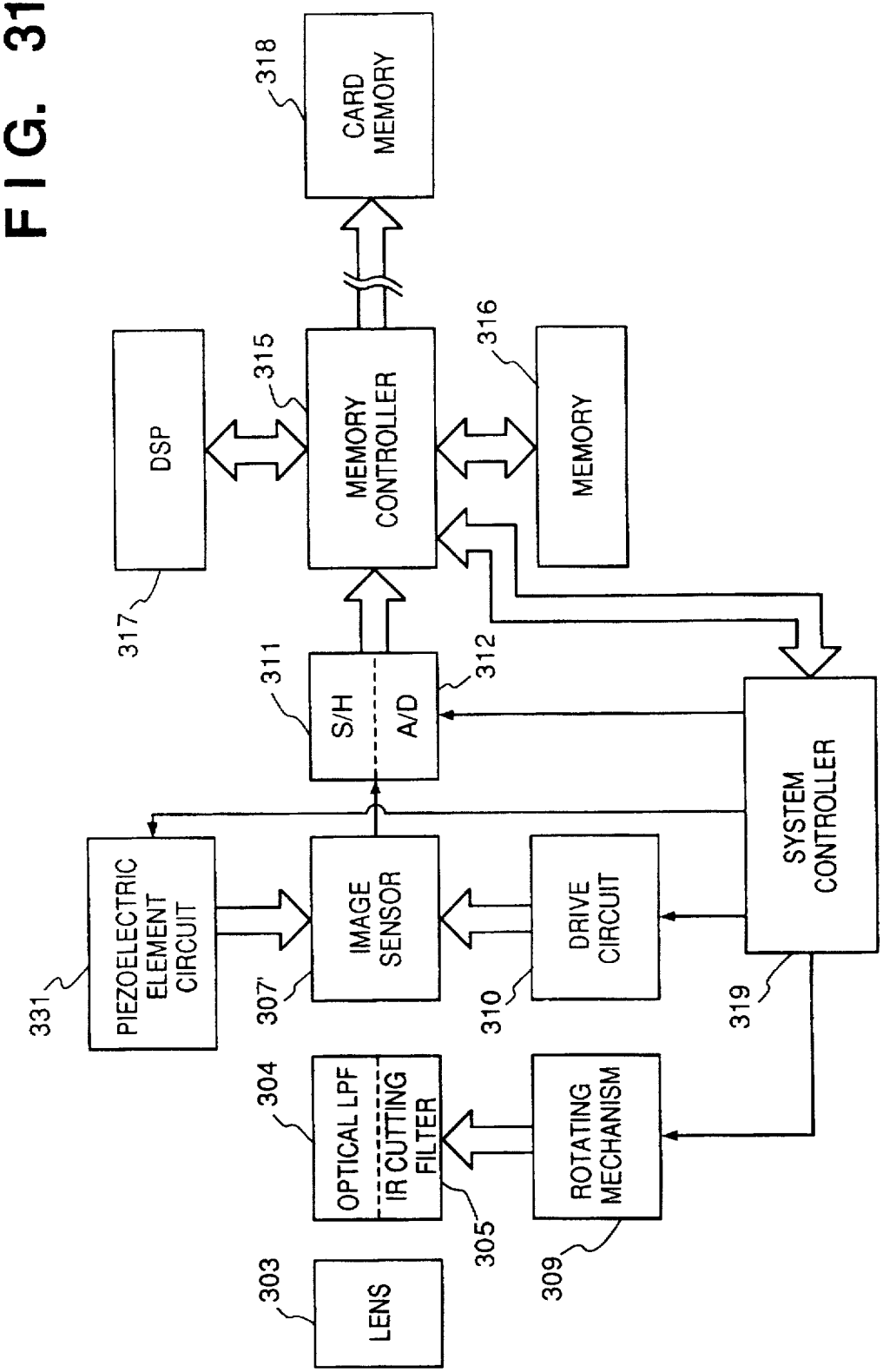
FIG. 31 is a block diagram illustrating the construction of a digital still-video camera serving as an image sensing apparatus according to an eighth embodiment of the present invention.

A digital still-video camera according to a second embodiment will now be described. The digital still-video camera of this embodiment is characterized in that the image sensor 307 is made a high-definition sensor by using a piezoelectric element. FIG. 31 is a block diagram illustrating the construction of the digital still-video camera according to the second embodiment. Components identical with those of the first embodiment are designated by like reference characters. The digital still-video camera, indicated at numeral 50, has a piezoelectric element circuit 331 for moving the image sensor 307 with respect to an optical image.

Figure 32A:
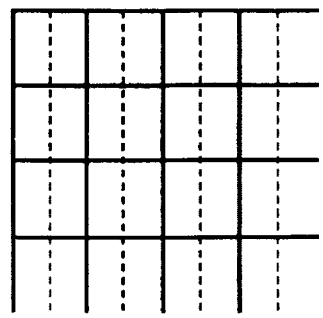
FIGS. 32A–32C are explanatory views showing movement of an image sensor relative to an optical image.
Figure 32B:
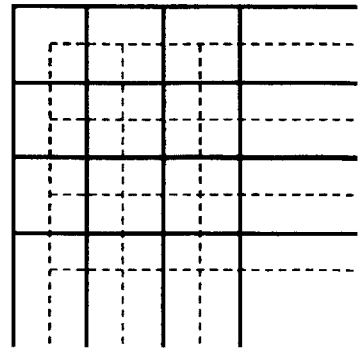
Figure 32C:
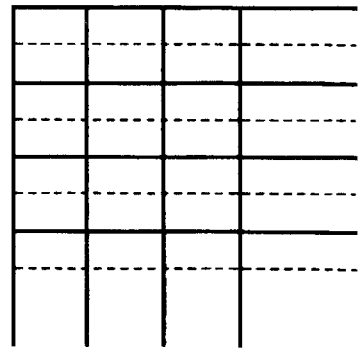
Figure 33:
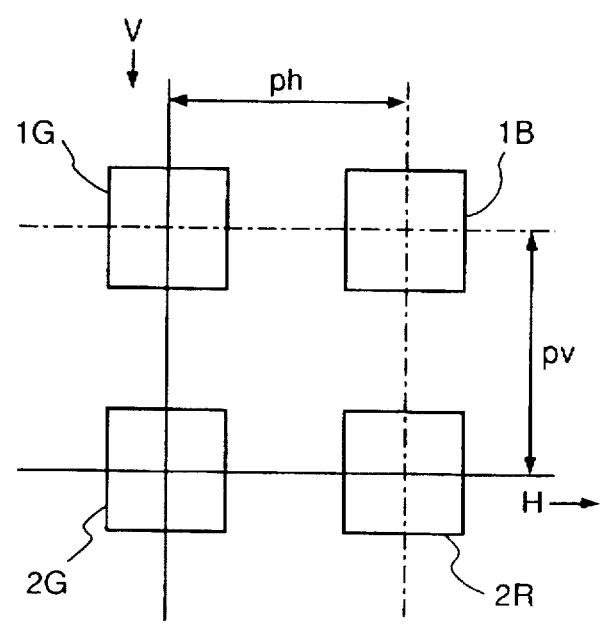
FIG. 33 is a diagram showing the array of pixels and an example of an aperture in a conventional solid-state image sensing element.
Figure 34:
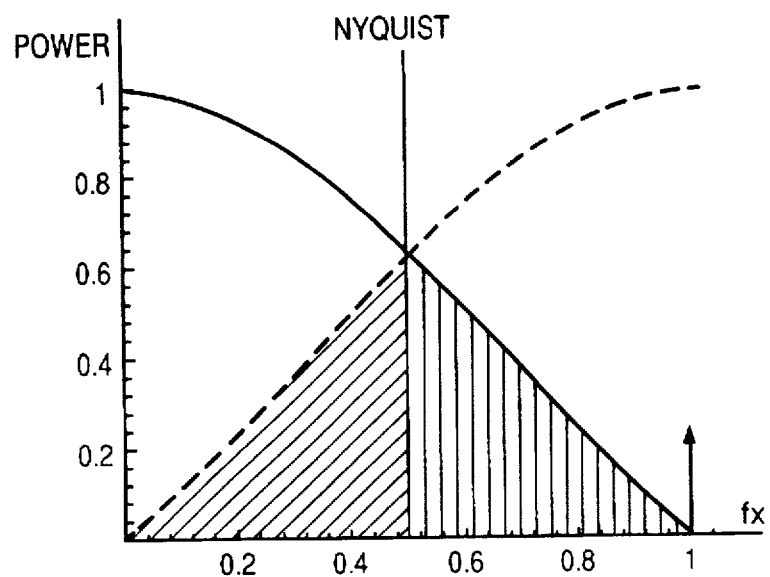
FIG. 34 is a diagram showing a spatial frequency spectrum according to the prior art.
Figure 35:
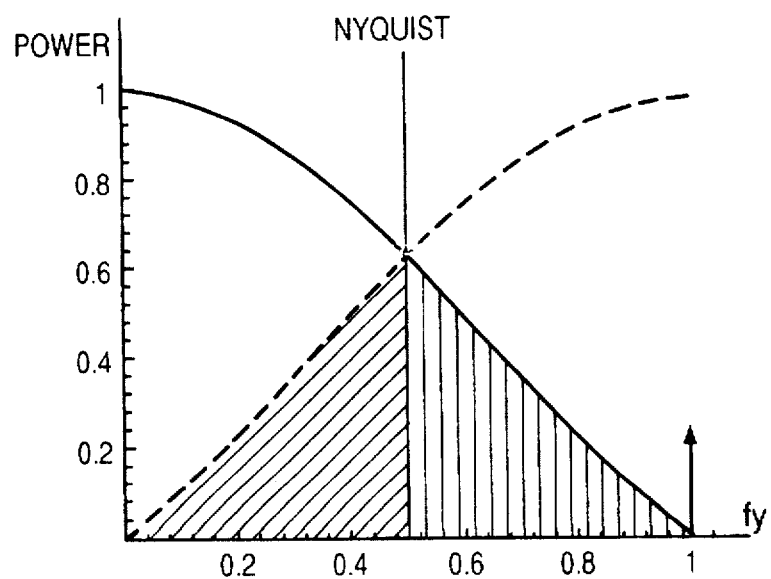
FIG. 35 is a diagram showing a spatial frequency spectrum according to the prior art.
Figure 36A:
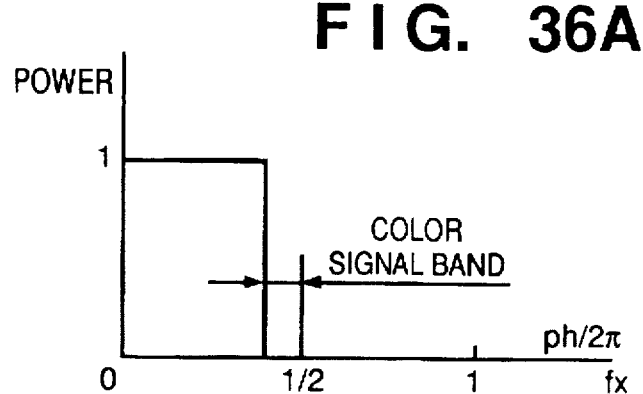
FIGS. 36A, 36B are diagrams showing ideal optical frequency characteristics.
Figure 36B:
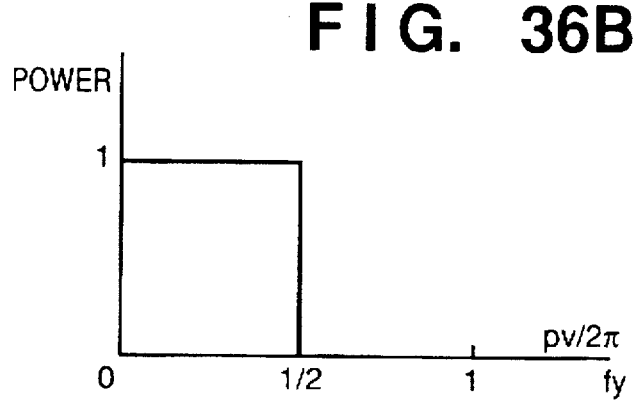

When a high-resolution mode is selected, the stacked member 325 comprising the optical low-pass filter (LPF) 304 and infrared (IR) cutting filter 305 is rotated through a predetermined angle in the same manner as in the first embodiment. Next, in accordance with a command from the sequence controller 319, the piezoelectric element circuit 331 moves the image sensor 307 relative to the optical image over a distance of one pixel pitch or less with regard to the same subject. FIG. 32 is a diagram showing movement of the image sensor 307 with respect to the optical image, in which (a) illustrates movement by a half pixel in the horizontal direction with regard to ordinary photography; (b) shows movement by a half pixel in the both the horizontal and vertical directions; and (c) depicts movement by a half pixel in the vertical direction. In other words, a high-definition image of one picture is synthesized from four pictures in conformity with ordinary photography. Twice the pixel data both horizontally and vertically is obtained in comparison with the first embodiment.

Though generation of luminance and color signals is similar to that of the first embodiment, color signals may be generated without making a change to black and white.

Figure 6:
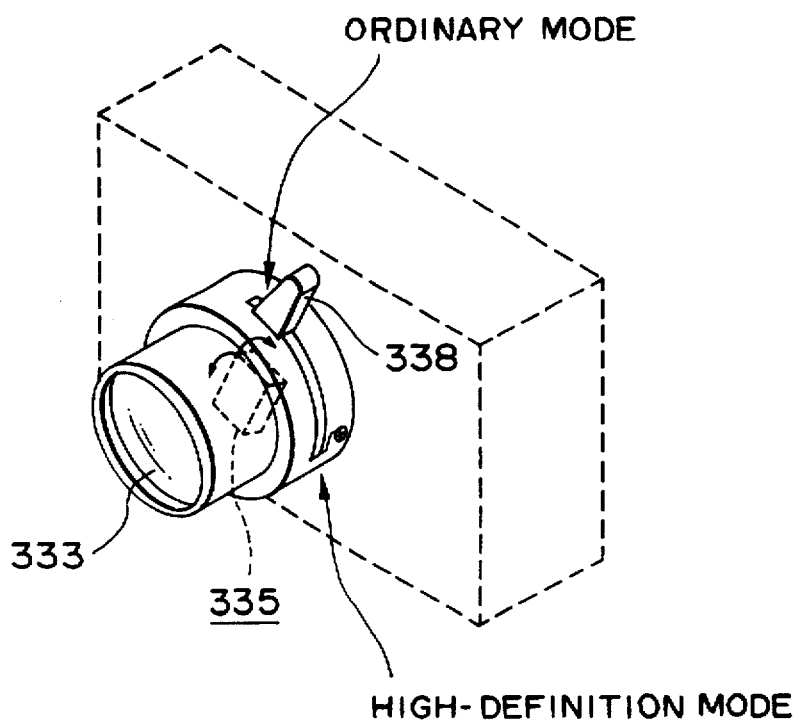
FIG. 6 is an explanatory view schematically illustrating the external appearance of a digital still-video camera in which a rotating lever for manually rotating a stacked member is provided on the periphery of a lens.

In the first and second embodiments, the stacked member is rotated using a stepping motor. However, it is possible to rely upon a different method. Further, in the first and second embodiments, the optical low-pass filter (LPF) 304 and infrared (IR) cutting filter 305 are rotated together by rotating the stacked member 325 formed on the surface of the gear 323. However, when the infrared (IR) cutting filter is provided separately of the optical low-pass filter, the rotating mechanism may be one which rotates only the optical low-pass filter with respect to the infrared cutting filter. FIG. 6 is an explanatory view schematically illustrating the external appearance of a digital still-video camera in which a rotating lever 338 for manually rotating a stacked member 335 is provided on the periphery of a lens 333. The rotating lever 338 is changed over between an ordinary mode and a high-definition mode by being operated manually, and a switch also is provided for simultaneously changing over the signal processing in conformity with the mode.

In this embodiment, an image sensor based upon a complementary-color mosaic filter and a digital signal processing circuit (DSP) are used. However, applications for cases other than these also are possible. It will suffice to decide an angle of rotation in such a manner that the pass band in the horizontal and vertical directions is made as broad as possible.

In accordance with the image sensing apparatus of the present invention, an optical image is converted to an electric signal by an image sensing element and the electric signal resulting from the conversion is processed by signal processing means. At this time an optical low-pass filter placed on the front surface of the image sensing element on the side of the optic axis thereof is rotated by rotational drive means through a predetermined angle about the optic axis. This makes it possible to make the apparatus small in size. Further, since the optical low-pass filter is not eliminated completely, it is possible to prevent the occurrence of moiréstripes due to return of high-frequency components.

In accordance with the image sensing apparatus of the present invention, the image sensing element is a solid-state image sensing element. This makes it possible to reduce the size of the apparatus incorporating the element, such as a CCD.

In accordance with the image sensing apparatus of the present invention, the predetermined angle is set in such a manner that the pass band of the optical low-pass filter becomes broadest in at least one of the horizontal and vertical directions. This makes it possible to accept a high-definition image.

In accordance with the image sensing apparatus of the present invention, the predetermined angle is set to a range of 45 ±5° when the pass band lies within a generally rectangular zone delimited by the horizontal and vertical directions. As a result, a high-definition image can be accepted using a low-pass filter having a generally rectangular pass band.

In accordance with the image sensing apparatus of the present invention, the luminance signal is generated by generating means provided in the signal processing means. When the optical low-pass filter is being rotated, the procedure through which the luminance signal is generated is changed. This makes it possible to change over to image processing conforming to high definition.

In accordance with the image sensing apparatus of the present invention, the luminance signal is generated by multiplying the values of the pixels of the image sensing element by a constant. As a result, high-definition image processing can be carried out through simple processing.

In accordance with the image sensing apparatus of the present invention, display at the time of playback is a monochrome image based upon the luminance signal when the optical low-pass filter is being rotated. As a result, processing at the time of reproduction can be simplified.

In accordance with the image sensing apparatus of the present invention, an index indicative of an image obtained by photography performed upon rotating the optical low-pass filter is recorded in information added on to the monochrome image. At the time of playback, the index is discriminated, the discriminated monochrome image is subjected to an optical reading operation and the read results are displayed and recorded. This makes it possible to recognize a character from a character image even in the case of a monochrome image.

In accordance with the image sensing apparatus of the present invention, the rotational driving means is a manual lever, and the manual lever has switching means for changing over signal processing performed by the signal processing means. As a result, changeover can be performed even by a manual operation.

In accordance with the image sensing apparatus of the present invention, an infrared cutting filter is separately provided on the front surface of the optical low-pass filter, and the rotational driving means rotates the optical low-pass filter through a predetermined angle with respect to the infrared cutting filter. As a result, the optical low-pass filter can be arranged freely without molding it as part of the infrared cutting filter.

In accordance with the image sensing method of the present invention, in which an optical image is converted to an electric signal and the resulting electric signal is processed, an optical low-pass filter is placed on the front surface of the image sensing element on the optic-axis side thereof, and the optical low-pass filter is rotated through a predetermined angle about the optic axis. As a result, the apparatus can be made small in size. Further, since the optical low-pass filter is not eliminated completely, it is possible to prevent the occurrence of moiré stripes due to return of high-frequency components.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus comprising:
    color image sensing means for sensing a color image;
    an optical low-pass filter composed of a plurality of parts and placed in front of said color image sensing means;
    changeover means for changing a mode of the apparatus between a first mode, in which a predetermined color image signal is generated based on an output of said color image sensing means, and a second mode, in which a monochrome image signal is generated based on an output of said color image sensing means; and
    rotation means for rotating at least a part of said optical low-pass filter around an optical axis of incident light on said color image sensing means in connection with a changeover operation of said changeover means.

2. An image sensing apparatus according to claim 1, further comprising calculation means for calculating a signal from said color image sensing means with a predetermined first coefficient to generate a color image signal in the first mode, and for calculating a signal from said color sensing means with a predetermined second coefficient to generate a monochrome image signal in the second mode, in connection with a changeover operation of said changeover means.

3. An image sensing apparatus according to claim 1, further comprising adding means for adding to an output of said color image sensing means information indicating whether an image sensing is performed in the first mode or the second mode, in connection with a changeover operation of said changeover means.

4. An image sensing apparatus comprising:
    image sensing means for converting an input image of an object to an electrical signal;
    an optical low-pass filter composed of a plurality of parts and placed in front of said image sensing means;
    changeover means for changing a mode of the apparatus between a first mode, in which an image sensing is performed by shifting periodically a positional relationship between said image sensing means and the input image, and a second mode, in which an image sensing is performed without shifting the positional relationship; and
    rotation means for rotating at least a part of said optical low-pass filter around an optical axis of incident light on said image sensing means in connection with a changeover operation of said changeover means.

5. An image sensing means according to claim 4, wherein the positional relationship is shifted periodically by a predetermined distance relating to a pitch of pixels of said image sensing means.

6. An image sensing apparatus comprising:
    image sensing means for sensing an image;
    an optical low-pass filter composed of a plurality of parts and placed in front of said image sensing means;
    changeover means for changing a mode of the apparatus between a first mode, in which a predetermined first image signal is generated based on an output of said image sensing means, and a second mode, in which a second image signal different from the first image signal is generated based on an output of said image sensing means;
    rotation means for rotating at least a part of said optical low-pass filter around an optical axis of incident light on said image sensing means in connection with a changeover operation of said changeover means; and
    recording means for adding to an output of said image sensing means information indicating that at least a part of said optical low-pass filter is rotated by a predetermined amount by said rotation means, and for recording the added result.

7. An image sensing apparatus according to claim 6, further comprising calculation means for calculating a signal from said sensing means with a predetermined first coefficient to generated a color image signal in the first mode, and for calculating a signal from said sensing means with a predetermined second coefficient to generate a monochrome image in the second mode, in connection with a changeover operation of said changeover means.

* * * * *

UNITED STATES PATENT AND TRADEMARK OFFICE
CERTIFICATE OF CORRECTION

PATENT NO. : 5,781,236

DATED : July 14, 1998

INVENTOR(S): KENICHI SHINBORI ET AL.

It is certified that error appears in the above-identified patent and that said Letters Patent is hereby corrected as shown below:

COLUMN 3

Line 13, "he" should read --the--.

COLUMN 11

Line 6, "d1/√2in" should read --d1/√2 in--.
   Line 51, "he" should read --the--.

COLUMN 12

Line 26, "fixed1y" should read --fixedly--.
   Line 37, "fixed1y" should read --fixedly--.

COLUMN 13

Line 53, "d2-d1)," should read --d2-d1,--.

COLUMN 14

Line 47, "moiréis" should read --moiré is--.

COLUMN 16

Line 23, "illustrates" should read --illustrate--.

UNITED STATES PATENT AND TRADEMARK OFFICE
CERTIFICATE OF CORRECTION

PATENT NO. : 5,781,236

DATED : July 14, 1998

INVENTOR(S) : KENICHI SHINBORI ET AL.

It is certified that error appears in the above-identified patent and that said Letters Patent is hereby corrected as shown below:

COLUMN 17

Line 12, "only" should read --only in--.
   Line 17, "only" should read --only in--.
   Line 36, "The" should read --This--.

COLUMN 18

Line 3, "the" (first occurrence) should be deleted.
   Line 49, "moiréstripes" should read --moiré stripes--.

COLUMN 19

Line 48, "moiréstripes" should read --moiré stripes--.

COLUMN 20

Line 4, "calculation" should read --processing--; and "calculating" should read --processing--.
   Line 7, "calculating" should read --processing--.
   Line 59, "calculation" should read --processing--; and "calculating" should read --processing--.
   Lien 61, "generated" should read --generate--.

UNITED STATES PATENT AND TRADEMARK OFFICE
CERTIFICATE OF CORRECTION

PATENT NO. : 5,781,236

DATED : July 14, 1998

INVENTOR(S) : KENICHI SHINBORI ET AL.

It is certified that error appears in the above-identified patent and that said Letters Patent is hereby corrected as shown below:

<u>COLUMN 20 CONTINUED</u>

Line 62, "calculating" should read --processing--.

Signed and Sealed this

Eleventh Day of July, 2000

Attest:

Q. TODD DICKINSON

*Attesting Officer*     *Director of Patents and Trademarks*